US008960753B2

(12) United States Patent
Horiuchi et al.

(10) Patent No.: US 8,960,753 B2
(45) Date of Patent: Feb. 24, 2015

(54) STORAGE STRUCTURE OF SADDLE RIDING TYPE VEHICLE

(71) Applicant: Honda Motor Co., Ltd., Tokyo (JP)

(72) Inventors: Tetsu Horiuchi, Wako (JP); Hiroyuki Shinmura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/944,970

(22) Filed: Jul. 18, 2013

(65) Prior Publication Data

US 2014/0062120 A1    Mar. 6, 2014

(30) Foreign Application Priority Data

Aug. 28, 2012    (JP) .................. 2012-187251

(51) Int. Cl.
*B60R 7/06* (2006.01)
*B62J 17/06* (2006.01)
*B62K 19/46* (2006.01)

(52) U.S. Cl.
CPC .. *B60R 7/06* (2013.01); *B62K 19/46* (2013.01)
USPC ........................ 296/37.1; 296/78.1; 296/37.12

(58) Field of Classification Search
CPC ............ B60R 7/06; B62K 19/46; B62J 17/06
USPC .............. 296/78.1, 37.1, 37.8, 37.12
See application file for complete search history.

(56) References Cited

U.S. PATENT DOCUMENTS

| D264,894 S | * | 6/1982 | Halder .................. D12/426 |
| 4,693,382 A | * | 9/1987 | Galen .................... 211/189 |
| 5,678,875 A | * | 10/1997 | Zipperle et al. ............ 296/37.8 |
| 6,260,706 B1 | * | 7/2001 | Koefelda ................ 206/505 |
| 6,588,529 B2 | * | 7/2003 | Ishii et al. ............... 180/219 |
| 7,293,815 B2 | * | 11/2007 | Hwang .................. 296/37.12 |
| 8,104,816 B2 | * | 1/2012 | Lupton et al. ............ 296/37.1 |
| 2001/0048212 A1 | | 12/2001 | Tsuji |
| 2005/0134070 A1 | * | 6/2005 | Plentis et al. ............. 296/37.1 |
| 2008/0197647 A1 | | 8/2008 | Sakamoto et al. |

FOREIGN PATENT DOCUMENTS

| JP | 3-32576 U | | 3/1991 |
| JP | 2005-112313 | * | 4/2005 |

* cited by examiner

*Primary Examiner* — Dennis H Pedder
(74) *Attorney, Agent, or Firm* — Birch, Stewart, Kolasch & Birch, LLP

(57) ABSTRACT

A storage structure of a saddle riding type vehicle with enhanced ease of storage and removal of small storage articles. An article storage unit is provided so as to include an opening in a rear surface of a front portion cover and at a position facing a rider and to be longer in a longitudinal length extending in a vehicle longitudinal direction relative to a height direction. In addition, a removable tray including riser walls along its periphery is disposed at a position closer to a lid than an inner wall of the article storage unit.

14 Claims, 15 Drawing Sheets

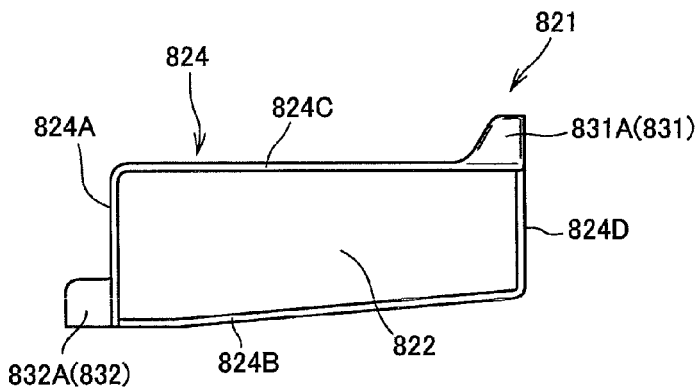
FIG. 14(B)
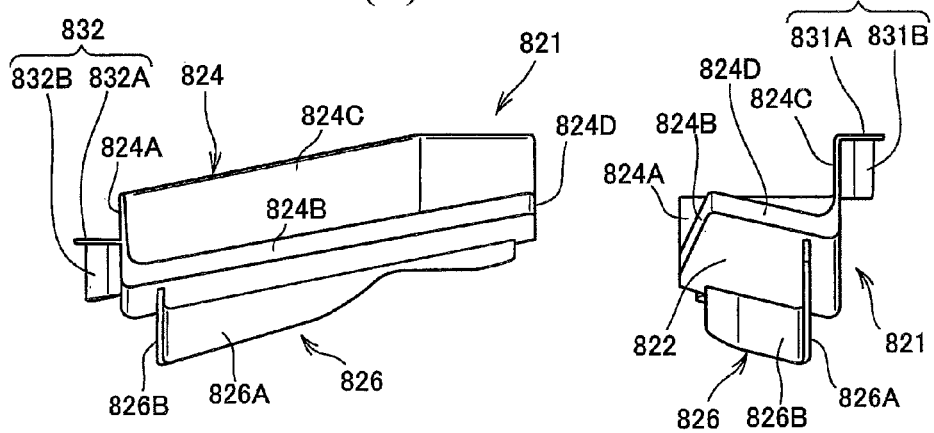
FIG. 14(A)
FIG. 14(D)
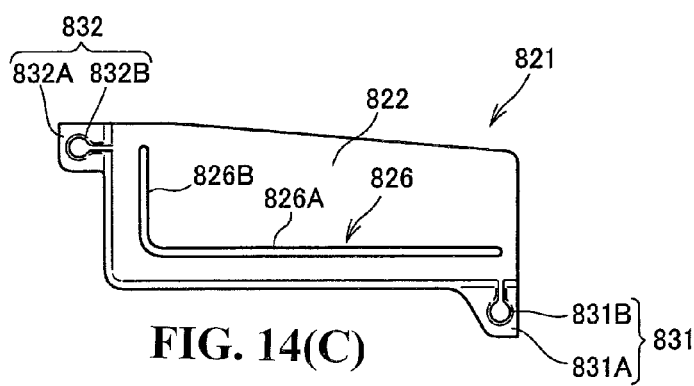
FIG. 14(C)

STORAGE STRUCTURE OF SADDLE RIDING TYPE VEHICLE

CROSS-REFERENCE TO RELATED APPLICATIONS

The present application claims priority under 35 USC 119 to Japanese Patent Application No. 2012-187251 filed Aug. 28, 2012 the entire contents of which are hereby incorporated by reference.

BACKGROUND OF THE INVENTION

1. Field of the Invention

The present invention relates to a storage structure of a saddle riding type vehicle including a storage unit having an opening in a rear surface of a front cover and positioned to face an occupant.

2. Description of Background Art

A known saddle riding type vehicle, such as a scooter type motorcycle, includes a storage unit having an opening in a rear surface of a front cover and at a position facing an occupant. An arrangement has been proposed for vehicles of this type wherein the storage unit would extend in a vehicle vertical direction. More specifically, a vertically long storage unit is provided having shelf boards disposed inside and vertically spaced apart from each other. See, for example, Japanese Utility Model Laid-Open No. Hei 3-32576.

The vertically long storage unit in the related-art arrangement can be utilized effectively. However, it is difficult to store an article in, or remove the article from, a storage unit formed to extend in a vehicle longitudinal direction. Since the saddle riding type vehicle has storage space restrictions, a need exists for a structure having enhanced ease of storage and removal of small storage articles.

SUMMARY AND OBJECTS OF THE INVENTION

According to an embodiment of the present invention, a storage structure of a saddle riding type vehicle is provided with enhanced ease of storage and removal of small storage articles.

To solve the foregoing problem, the present invention provides a storage structure of a saddle riding type vehicle, the storage structure including: a front portion cover (130) for covering a front portion of the saddle riding type vehicle with a storage unit (132) disposed in the front portion cover (130). The storage unit (132) includes an opening (132K) formed in a rear surface of the front portion cover (130) at a position facing a rider. A lid (134) is provided for openably covering the opening (132K). The storage unit (132) is formed to be longer in a longitudinal length extending in a vehicle longitudinal direction than in a height. A removable tray (821) is disposed at a position closer to the lid (134) than an inner wall (132A) of the storage unit (132), the tray (821) including riser walls (824) at a peripheral edge portion.

In the foregoing arrangement, the storage unit has the opening formed in the rear surface of the front portion cover and at the position facing the rider and is formed to be longer in the longitudinal length extending in the vehicle longitudinal direction than in the height. The removable tray is disposed at a position closer to the lid than the inner wall of the storage unit, the tray includes the riser walls at the peripheral edge portion. Thus, the tray can enhance ease of storage and removal of a small article. A large-sized article can also be stored by removing the tray.

According to an embodiment of the present invention, the saddle riding type vehicle may include a head pipe (12) for steerably journaling a front wheel (2), and a seat (10) disposed at a vehicle width center rearward of the head pipe (12). The storage unit (132) may be disposed on one side in a vehicle width direction of the head pipe (12), and the tray (821) may be disposed on the one side in the vehicle width direction of a bottom wall (132C) of the storage unit (132). In the foregoing arrangement, when a rider faces a stored article through the opening, the rider can easily recognize the tray and the article stored in the tray, which also enhances ease of storage and removal.

According to an embodiment of the present invention, the bottom wall (132C) of the storage unit (132) may be formed downwardly of the opening (132K). This arrangement expands a storage space downwardly, while mounting of the tray raises the level of the storage position, achieving better visibility and ease of storage and removal of a small article. The article stored in the tray can also be taken out by removing the tray.

According to an embodiment of the present invention, the tray (821) may be disposed adjacent to a side wall (132D) on an outer side in the vehicle width direction of the storage unit (132) and the inner wall (132A) of the storage unit (132). A riser wall (824B) of the riser walls (824), the riser wall (824B) being adjacent to the side wall (132D), may be formed to be lower in height than riser walls (824A, 824C) of the riser walls (824), the riser walls (824A, 824C) not being adjacent to the side wall (132D). In the arrangement, the storage space of the tray can be partitioned using the article storage unit thereby to increase the storage capacity of the tray and to facilitate loading and unloading of articles.

According to an embodiment of the present invention, the storage unit (132) may have a power supply port (180), and the tray (821) may be disposed downwardly of the power supply port (180). This allows a compact electronic device requiring external electric power to be placed in the tray and supplied with the electric power. A power wire can be routed without being impeded by other stored articles.

According to an embodiment of the present invention, the storage structure may further include projections (831B, 832B) disposed on the tray (821 with U-shaped fit portions (132M, 132N) disposed on the storage unit (132). The U-shaped fit portions (132M, 132N) include clearances into or from which the projections (831B, 832B) can advance or retract, respectively, and in the rear of which the projections (831B, 832B) engage. These arrangements enhance the ease of removal of the tray.

According to an embodiment of the present invention, the tray (821) may have a bottom wall (822) inclined so as to be lower in level toward a center in the vehicle width direction. In the arrangement, the inclined bottom wall allows an article to be stored closer to the center in the vehicle width direction in the tray. Thus, the convenience of ease of removal of the stored article is enhanced.

According to an embodiment of the present invention, the storage unit has the opening in the rear surface of the front portion cover and at a position facing the rider and is formed longer in the longitudinal length extending in the vehicle longitudinal direction than in the height. The removable tray is disposed at a position closer to the lid than the inner wall of the storage unit with the tray including the riser walls along its periphery. Thus, the ease of storage and removal of a small article can be enhanced.

If the storage unit is disposed on one side in the vehicle width direction of the head pipe that steerably journals the front wheel and the tray is disposed on the one side in the vehicle width direction of the bottom wall of the storage unit. Thus, the tray and the article stored in the tray are easy to recognize.

If the bottom wall of the storage unit is formed downwardly of the opening, the storage space can be expanded downwardly, while the tray achieves better visibility and ease of storage and removal of a small article.

If the tray is disposed adjacent to the side wall on the outer side in the vehicle width direction and to the inner wall of the storage unit, and if the riser wall adjacent to the side wall is formed to be lower in height than the riser walls not adjacent thereto, the storage space of the tray can be partitioned using the article storage unit, thereby to increase the storage capacity of the tray and to facilitate loading and unloading of articles.

If the storage unit has the power supply port and the tray is disposed downwardly of the power supply port, a compact electronic device requiring external electric power can be placed in the tray and supplied with the electric power.

If the tray includes the projections and the storage unit includes the U-shaped fit portions having clearances into or from which the projections can advance or retract, respectively, and in rear of which the projections engage, ease of removal of the tray can be enhanced.

If the tray bottom wall is inclined so as to be lower in level toward the center in the vehicle width direction, an article can be stored in the tray closer to the center in the vehicle width direction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 14(A) is a left side elevational view showing the tray;

FIG. 14(B) is a top view showing the tray;

FIG. 14(C) is a bottom view showing the tray;

FIG. 14(D) is an illustration showing the tray viewed from the rear; and

DETAILED DESCRIPTION OF THE PREFERRED EMBODIMENTS

Figure 1:
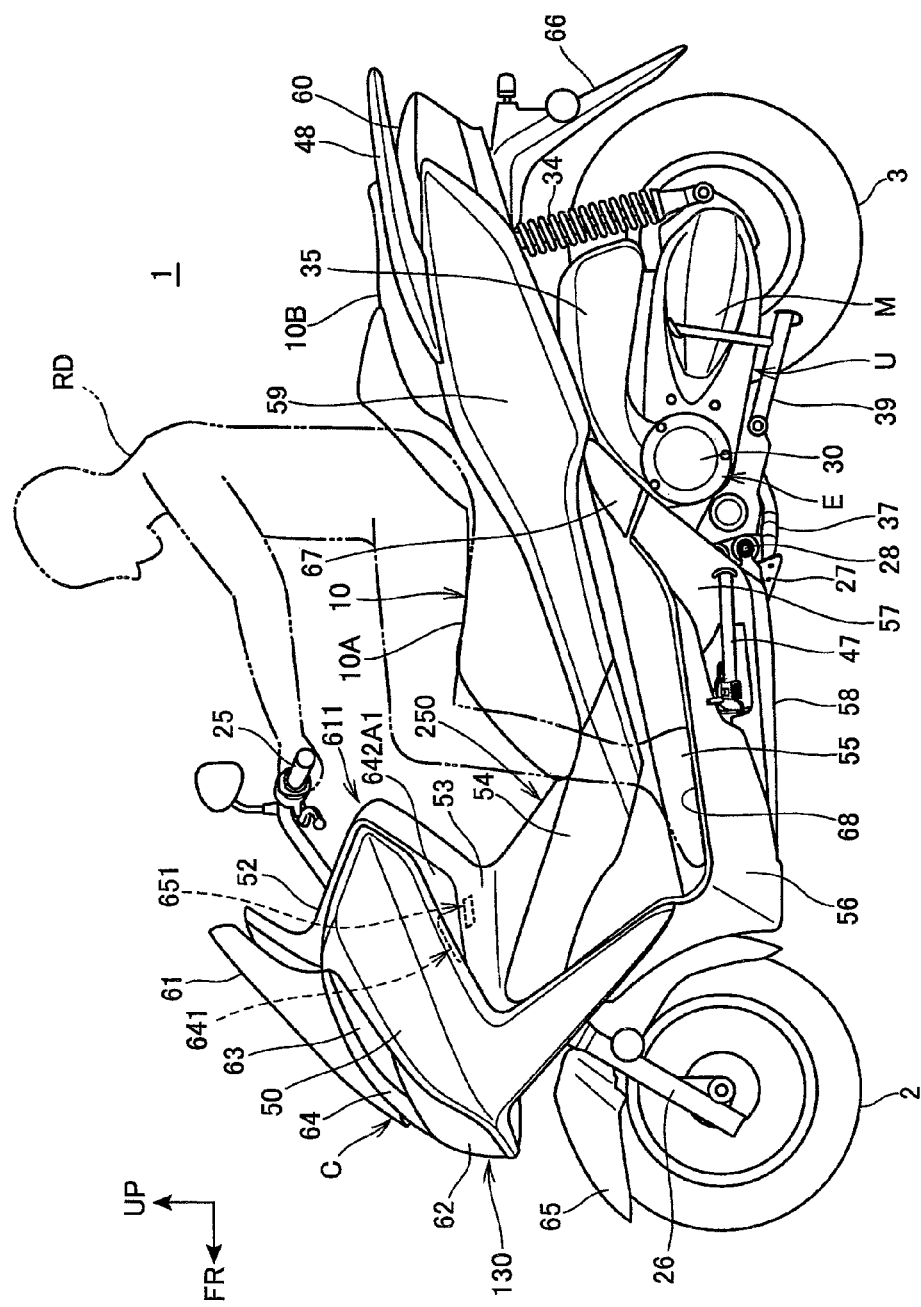
FIG. 1 is a left side elevational view showing a motorcycle according to an embodiment of the present invention.

A specific embodiment of the present invention will be described below with reference to the accompanying drawings. Throughout the descriptions given hereunder, longitudinal, lateral, and vertical directions are the same as directions relative to a vehicle body unless otherwise specified. In the drawings, a symbol FR denotes a vehicle forward direction, a symbol UP denotes a vehicle upward direction, and a symbol LE denotes a vehicle leftward direction.

Figure 2:
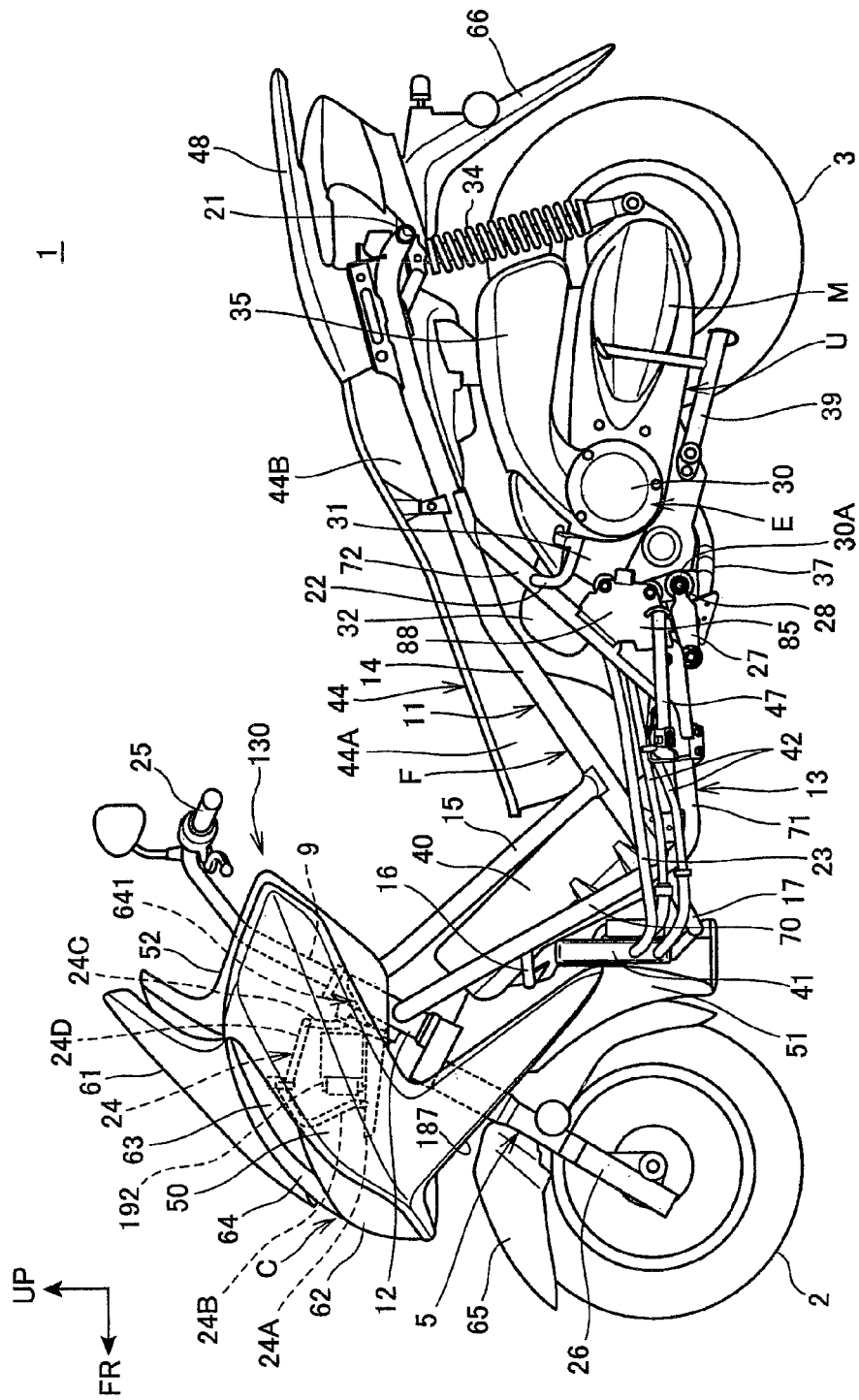
FIG. 2 is a left side elevational view showing an internal structure of the motorcycle.
Figure 3:
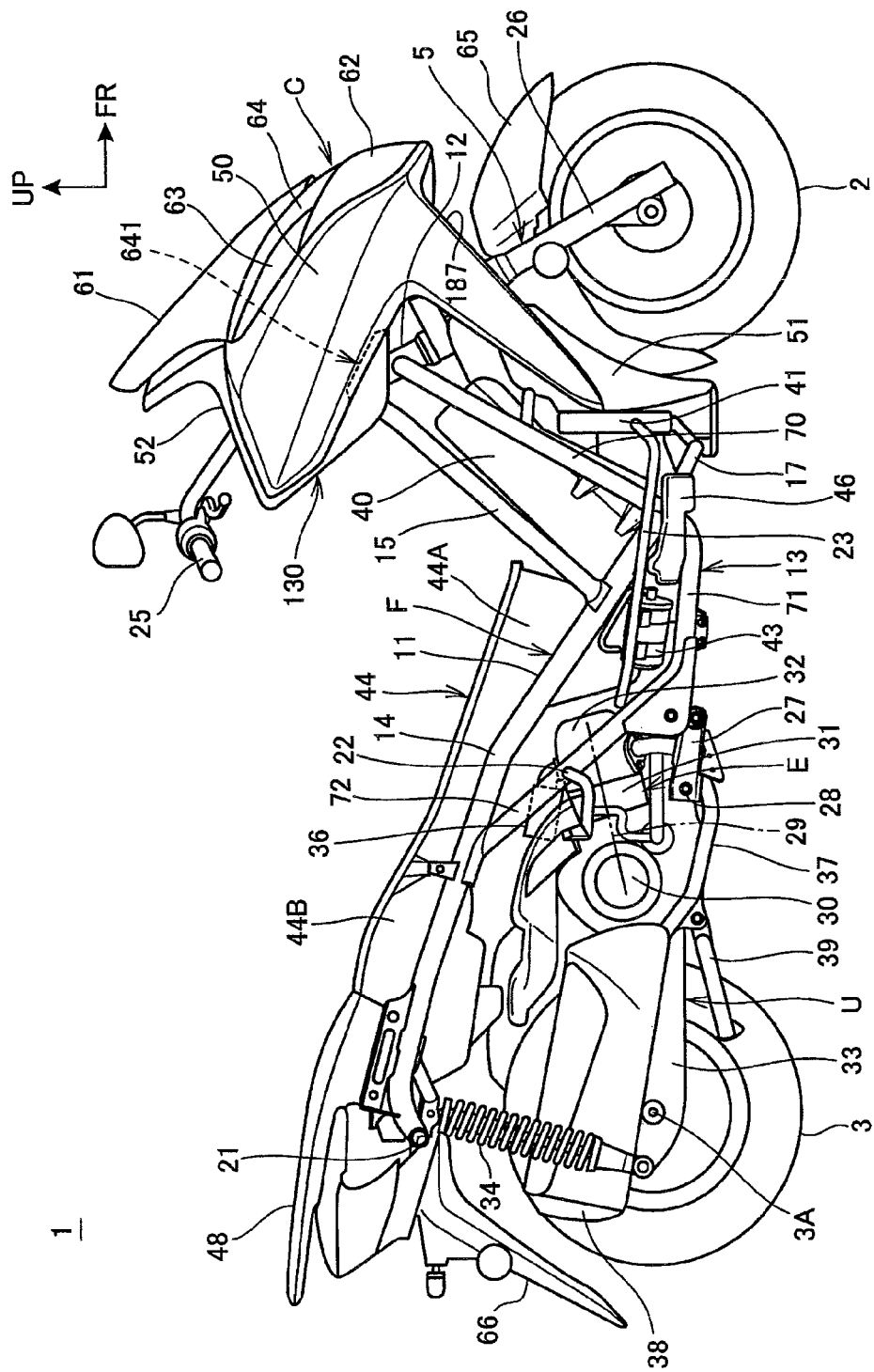
FIG. 3 is a right side elevational view showing the internal structure of the motorcycle.

FIG. 1 is a left side elevational view showing a motorcycle 1 according to the embodiment of the present invention. FIG. 2 is a left side elevational view showing an internal structure of the motorcycle 1. FIG. 3 is a right side elevational view showing the internal structure of the motorcycle 1.

The motorcycle (saddle riding type vehicle) 1 is a scooter type vehicle including a low step floor 68 on which an occupant (rider) RD sitting in a seat 10 rests his or her feet. The motorcycle 1 includes a vehicle body frame F (FIGS. 2 and 3), a front wheel 2 disposed forwardly of the vehicle body frame F and a rear wheel 3 as a drive wheel journaled by a unit swing engine (also called a unit swing power unit) U disposed at a vehicle rear portion. The vehicle body frame F is covered by a resin-made vehicle body cover C. It is noted that part of the vehicle body cover C is shown removed in FIGS. 2 and 3.

Figure 4:
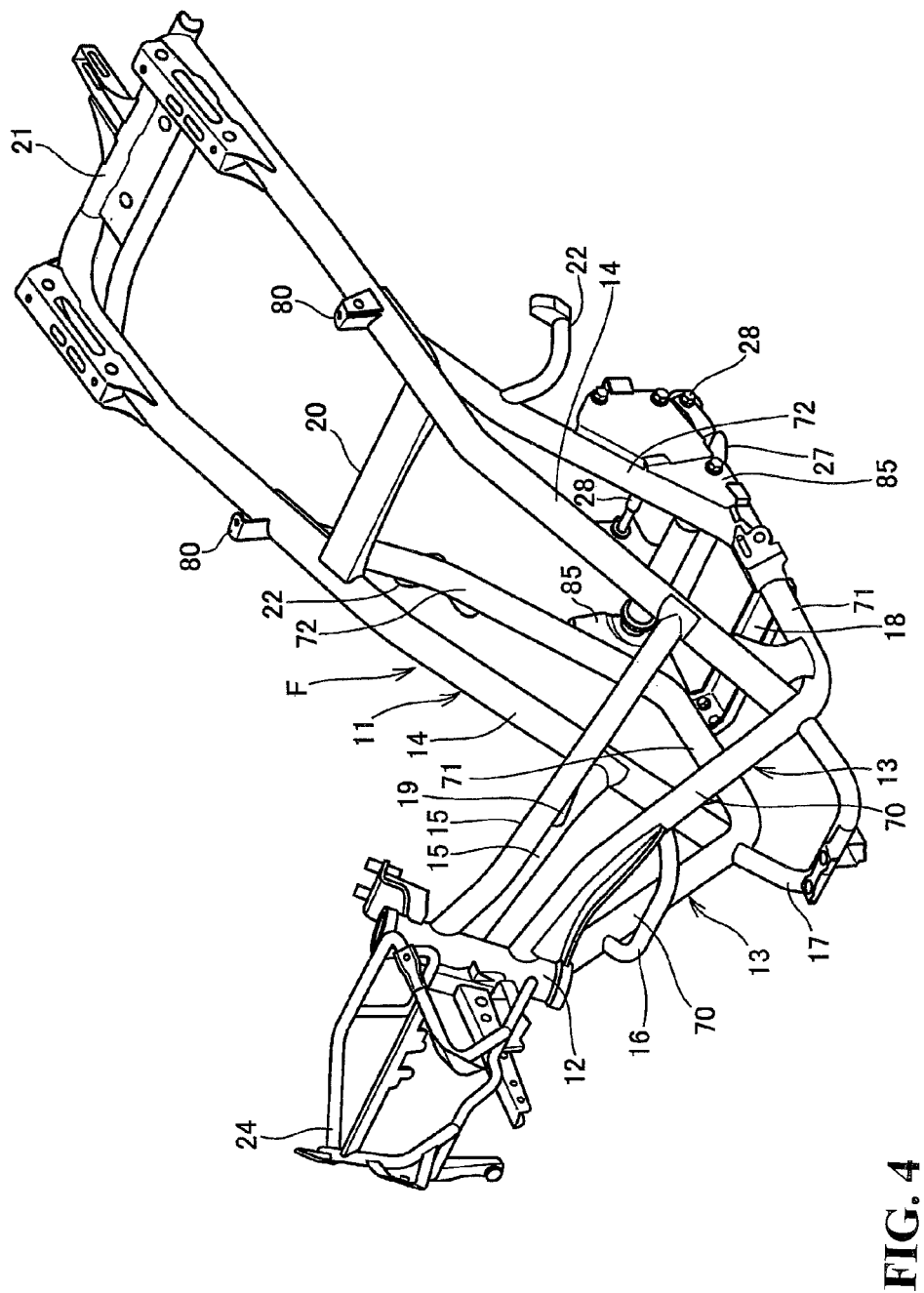
FIG. 4 is a perspective view showing a vehicle body frame.

FIG. 4 shows the vehicle body frame F.

As shown in FIGS. 2 to 4, the vehicle body frame F is formed of a plurality of metal tubes and pipes connected through welding. A main frame 11 of the vehicle body frame F includes a head pipe 12, a pair of left and right lower side down frames 13, 13, a pair of left and right seat rails 14, 14, and a pair of left and right upper side down frames (hereinafter referred to as upper frames) 15, 15. More specifically, the head pipe 12 is disposed at a front portion. The lower side down frames 13, 13 extend downwardly toward the rear from the head pipe 12, extend rearwardly in a substantially horizontal direction, and then extend upwardly toward the rear at a rear portion. The seat rails 14, 14 extend from front lower portions of the lower side down frames 13, 13 upwardly toward the rear and up to a vehicle rear portion. The upper frames 15, 15 extend from the head pipe 12 downwardly toward the rear above the lower side down frames 13, 13 and are connected to the seat rails 14, 14.

The lower side down frames 13, 13 each include a downward extension portion 70, a horizontal extension portion 71, and an obliquely upward extension portion 72. More specifically, the downward extension portion 70 has a front end connected to the head pipe 12 and extends downwardly toward the rear. The horizontal extension portion 71 extends from a lower end of the downward extension portion 70 rearwardly in a substantially horizontal direction. The obliquely upward extension portion 72 extends from a rear end of the horizontal extension portion 71 upwardly toward the rear.

As shown in FIG. 4, the main frame 11 includes cross members connecting left and right sides of the frame. The cross members include a front upper portion cross member 16, a front cross member 17, a horizontal portion cross member 18, a pair of front and rear cross members 19, 19, an intermediate cross member 20, and a rear portion cross member 21. More specifically, the front upper portion cross member 16 connects upper portions of the downward extension portions 70, 70 of the lower side down frames 13, 13. The front cross member 17 connects lower portions of the downward extension portions 70, 70. The horizontal portion cross member 18 connects the horizontal extension portions 71, 71 of the lower side down frames 13, 13. The pair of front and rear cross members 19, 19 connects the upper frames 15, 15. The intermediate cross member 20 connects the seat rails 14, 14. The rear portion cross member 21 connects rear portions of the seat rails 14, 14. The horizontal portion cross member 18 is bolted to the horizontal extension portions 71, 71.

A pair of left and right tandem step stays 22, 22 extending outwardly in a vehicle width direction is disposed at upper portions of the obliquely upward extension portions 72, 72 of the lower side down frames 13, 13.

A basket-shaped front portion frame 24 that supports, for example, lights and the vehicle body cover C is connected to a front surface of the head pipe 12.

A pair of left and right step frames 23, 23 (FIGS. 2 and 3) that support the step floor 68 from below is disposed on outer sides of the main frame 11. The step frames 23, 23 are connected to the lower side down frames 13, 13 and extend longitudinally.

As shown in FIGS. 2 to 4, a steering system for steering the front wheel 2 includes a steering shaft 9 (FIG. 2) and a handlebar 25. The steering shaft 9 is rotatably journaled on the head pipe 12. The handlebar 25 is connected to an upper portion of the steering shaft 9. The steering shaft 9 has a lower end connected to a pair of left and right front forks 26, 26. The front wheel 2 is journaled at lower ends of the front forks 26, 26 and steered through an operation on the handlebar 25.

The unit swing engine U is a unit swing type that integrates an engine E with a transmission case M in which a belt type continuously variable transmission mechanism is housed. The unit swing engine U functions also as a swing arm for supporting the rear wheel 3. The unit swing engine U is connected to a rear portion of the lower side down frames 13, 13 via a linkage member 27 connected to a front portion of the unit swing engine U. The unit swing engine U is vertically swingable about a pivot shaft 28 disposed in the linkage member 27. It is noted that the linkage member 27 has a front end connected to the rear portions of the lower side down frames 13, 13 via a pair of left and right power unit support portions 85, 85.

The engine E is a water-cooled, four-cycle, single-cylinder engine having a cylinder axis 29 extending forwardly in a substantially horizontal direction. The engine E includes a crankcase 30 disposed at a front portion of the unit swing engine U, and a cylinder 31 and a cylinder head 32 (FIGS. 2 and 3) connected to a front surface of the crankcase 30.

The transmission case M extends from a rear portion of the crankcase 30 rearwardly along a left side of the rear wheel 3. An arm portion 33 (FIG. 3) is disposed at the rear portion of the crankcase 30. The arm portion 33 extends rearwardly along a right side of the rear wheel 3. The rear wheel 3 is supported on an axle 3A disposed between a rear portion of the transmission case M and a rear portion of the arm portion 33. An output from the engine E is transmitted to the rear wheel 3 via the continuously variable transmission mechanism.

Left and right rear suspensions 34, 34 are disposed across a rear end of the transmission case M and the left seat rail 14, and across a rear end of the arm portion 33 and the right seat rail 14, respectively.

An air cleaner box 35 (FIGS. 1 and 2) that draws in outside air is disposed on an upper surface of the transmission case M. The air cleaner box 35 is connected via a connecting tube not shown to a throttle body 36 (FIG. 3) connected to an intake port in an upper surface of the cylinder head 32.

An exhaust pipe 37 connected to an exhaust port in a lower surface of the cylinder head 32 extends rearwardly along a space downward of the engine E and is connected to a muffler 38 (FIG. 3) fixed to an outside (right side) of the arm portion 33.

A main stand 39 that can support the vehicle in an upright position is disposed at a lower portion of the rear portion of the transmission case M.

A fuel tank 40 that stores therein fuel for use in the engine E is formed into a shape that has, in a side view, a front surface inclined downwardly toward the rear along the downward extension portions 70, 70 of the lower side down frames 13, 13 and a rear surface inclined downwardly toward the rear along the upper frames 15, 15. In a vertical direction, the fuel tank 40 extends vertically long from a point rearward of a lower portion of the head pipe 12 to a point near the horizontal extension portions 71, 71 of the lower side down frames 13, 13. More specifically, the fuel tank 40 is formed into a tank that is inclined downwardly toward the rear in a space between the left and right lower side down frames 13, 13 and the left and right upper frames 15, 15.

A plate-shaped radiator 41 that cools coolant of the engine E is disposed in a space available downwardly of a front portion of the fuel tank 40. The radiator 41 and the fuel tank 40 are thus compactly disposed in a longitudinal direction.

A pair of coolant pipes 42 (FIG. 2) that connect the radiator 41 and the engine E extends from a left side portion of the radiator 41 along a space downwardly of the step frame 23 (FIG. 2) on the left side (one side) of the vehicle toward the rear and is connected to the engine E through the inside of the lower side down frame 13.

A side stand 47 is mounted on the left horizontal extension portion 71.

A reservoir tank 46 (FIG. 3) that stores part of the coolant of the radiator 41 is disposed downwardly of the step frame 23 on the right side (another side) of the vehicle at a position rearward of the radiator 41. In addition, a canister 43 (FIG. 3) that adsorbs evaporated fuel in the fuel tank 40 is disposed downwardly of the right step frame 23 at a position rearward of the reservoir tank 46.

A large-capacity storage box 44 (FIGS. 2 and 3) that can store therein articles is disposed rearwardly of the fuel tank 40. The storage box 44 is formed into a box shape that is longer in the longitudinal direction relative to its width (length in the vehicle width direction). The storage box 44 is mounted on the seat rails 14, 14 via box stays 80, 80 (FIG. 4) disposed on the seat rails 14, 14. The storage box 44 extends upwardly toward the rear across and along the seat rails 14, 14 from a point near a rear portion of the fuel tank 40 up to a point upward of the transmission case M.

The storage box 44 includes a front portion storage section 44A and a rear portion storage section 44B integrally formed with each other through resin molding. The front portion storage section 44A is disposed between the fuel tank 40 and the obliquely upward extension portions 72, 72 of the lower side down frames 13, 13. The rear portion storage section 44B is disposed upwardly of the unit swing engine U.

The storage box 44 has an upper surface open throughout its entire length. This opening is openably closed by the occupant's seat 10 (FIG. 1). The seat 10 is vertically rotatably supported by the vehicle body frame F about a front end thereof The seat 10 includes a front portion seat 10A in which the rider is seated and a rear portion seat 10B in which a passenger is seated. The rear portion seat 10B is formed to be higher than the front portion seat 10A.

A grab rail 48 is fixed to a rear portion of the seat rails 14, 14 rearwardly of the storage box 44.

Referring to FIG. 1, the vehicle body cover C will be described. The vehicle body cover C includes a front cover 50, a front lower cover 51 (FIGS. 2 and 3), an upper portion cover 52, an upper portion inner cover 53, a pair of left and right lower portion inner covers 54, 54, a pair of left and right step covers 55, 55, a pair of left and right front portion floor skirts 56, 56, a pair of left and right rear portion floor skirts 57, 57, an under cover 58, a pair of left and right body side covers 59, 59, and a tail cover 60. More specifically, the front cover 50 covers areas forward and to the left and right sides of the head pipe 12 and extends downwardly along an area forward of the downward extension portions 70, 70. The front lower cover 51 is connected to a lower portion of the front cover 50. The upper portion cover 52 is connected to an upper portion of the front cover 50 at a position downward of the handlebar 25. The upper portion inner cover 53 is connected to left and right edges of the front cover 50 and covers the head pipe 12, the upper frames 15, 15, and the downward extension portions 70, 70 from the rear and sides. The lower portion inner covers 54, 54 are connected to a lower edge of the upper portion inner cover 53 and cover the upper frames 15, 15 and the downward extension portions 70, 70. The step covers 55, 55 are connected to a lower portion of the front cover 50 and lower edges of the lower portion inner covers 54, 54, and cover the step frames 23, 23 from above. The front portion floor skirts 56, 56 are connected to the lower portion of the front cover 50 and lower portions of the step covers 55, 55, and cover the step frames 23, 23 from the sides. The rear portion floor skirts 57, 57 join to the front portion floor skirts 56, 56 and extend rearwardly, and cover the lower side down frames 13, 13. The under cover 58 covers the left and right horizontal extension portions 71, 71 from below. The body side covers 59, 59 are connected to rear portions of the lower portion inner covers 54, 54 and the step covers 55, 55 and cover the storage box 44 and the seat rails 14, 14 from the sides at positions downwardly of the seat 10. The tail cover 60 is connected to rear portions of the body side covers 59, 59.

The step floor 68 on which the rider RD sitting in the front portion seat 10A rests his or her foot is formed on each of bottom portions of the left and right step covers 55, 55.

The upper portion inner cover 53, the lower portion inner covers 54, 54, and the step covers 55, 55 described above constitute a center tunnel section 250 disposed downwardly of a space between the handlebar 25 and the seat 10.

The center tunnel section 250 connects a portion downward of the seat 10 to a leg shield 601 to be described later so as to cover from above the pair of left and right upper frames 15, 15 and the fuel tank 40 disposed at levels higher than the left and right step floors 68, 68.

In the center tunnel section 250, a portion adjacent to the leg shield 601, specifically, a straddling portion 250A formed of the upper portion inner cover 53 and the lower portion inner covers 54, 54 is inclined so as to approach the vehicle width center side at farther rearward distances, thereby achieving greater ease of egress/ingress for the rider RD.

A windscreen 61 extending upwardly toward the rear is disposed at a front portion of the front cover 50. A headlight 62 is disposed at a front end of the front cover 50. A pair of left and right direction indicators 63, 63 is disposed above the headlight 62 so as to join upper portions of the headlight 62. A plate-shaped garnish 64 is disposed between the headlight 62 and the windscreen 61.

A front fender 65 that covers the front wheel 2 from above is disposed at the front forks 26, 26. An open section 187 for disposing therein the front wheel 2 is formed in a space upward of the front fender 65 between an upper portion of the front lower cover 51 and the front cover 50. The steering system extends vertically through the open section 187.

A rear fender 66 that covers the rear wheel 3 from above is disposed downwardly of the body side covers 59, 59.

A pair of folding tandem steps 67, 67 (FIG. 1) on which the passenger sitting in the rear portion seat 10B rests his or her feet is supported by the tandem step stays 22, 22.

The front cover 50, the upper portion cover 52, and the upper portion inner cover 53 constitute a front portion cover 130 that assumes a front cowl for covering the area near the head pipe 12 (vehicle front portion).

Figure 5:
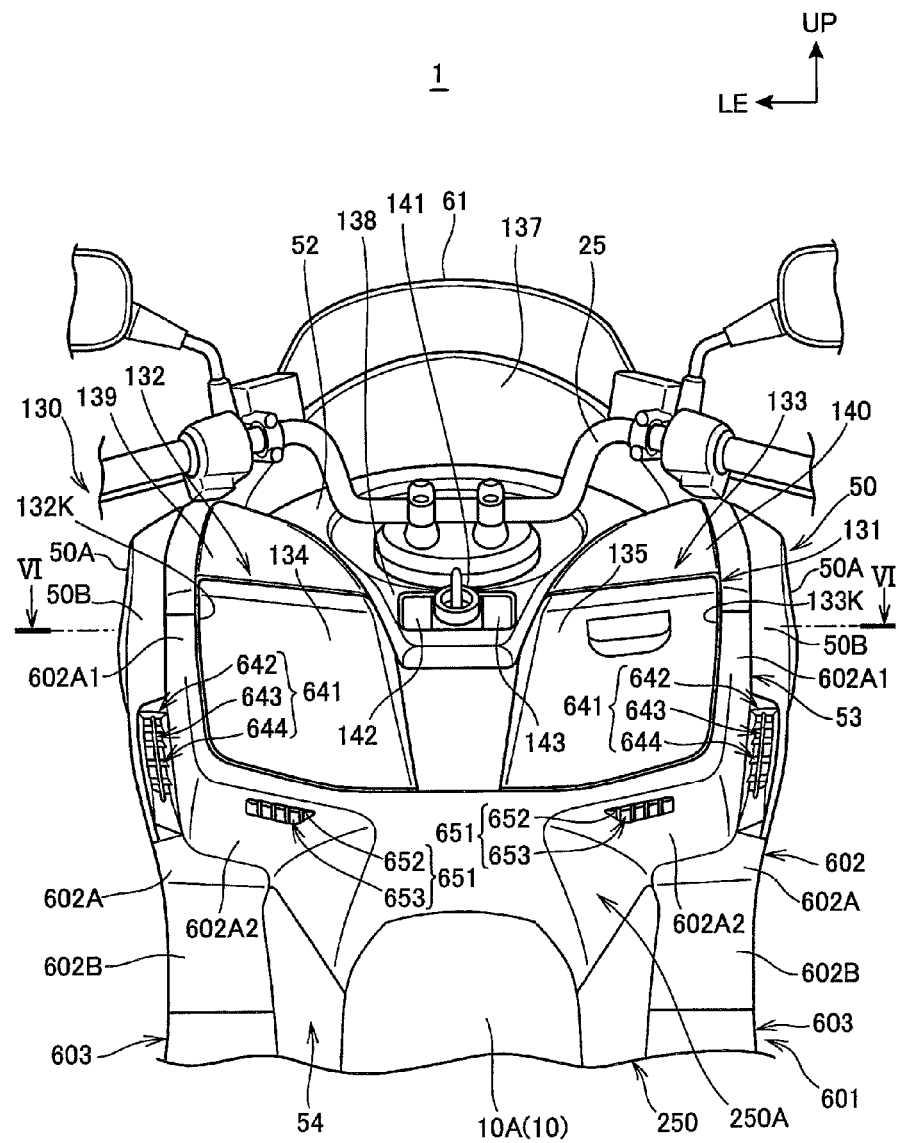
FIG. 5 is an illustration showing a vehicle body front portion viewed from a rear side.

FIG. 5 is an illustration showing a vehicle body front portion viewed from the rear side (the side of the seat 10).

A front portion storage box (storage unit) 131 in which articles can be stored is disposed at the front portion cover 130. The front portion storage box 131 includes an article storage unit 132 disposed on the left side of the head pipe 12 and an article storage unit 133 (storage unit) disposed on the right side of the head pipe 12. The article storage unit 132 and the article storage unit 133 are each formed into a box shape extending longitudinally in the front cover 50. The article storage units 132 and 133 have openings 132K and 133K, respectively, each of the openings 132K and 133K being formed in a rear surface of the front cover 50 and at a position facing the rider RD, functioning as an access port for reaching a stored article. In addition, the front cover 50 includes openable lids 134 and 135 that can be swung open about lower sides of the openings 132K and 133K of the article storage units 132 and 133. The lids 134 and 135 can be closed to keep the openings 132K and 133K in the article storage units 132 and 133 closed. By opening the lids 134 and 135, the openings 132K and 133K are opened to allow access to the article storage units 132 and 133, respectively.

An area between the left and right lids 134 and 135 rearward of the handlebar 25 is covered with a center panel 138. Areas upward of the lids 134 and 135 on the left and right of the center panel 138 are covered with a pair of left and right upper surface covers 139 and 140. The center panel 138 extends rearwardly to be inclined downwardly toward the rear. A key cylinder portion 141 and a pair of left and right pressing type operators 142 and 143 are disposed on the center panel 138. The key cylinder portion 141 is operated by a main key to turn on or off a vehicle ignition switch. One of the two operators 142 and 143 (the operator 142 on the left in the embodiment) functions as an operator for unlocking the lid 134 of the article storage unit 132 on the left-hand side. Another one of the two operators 142 and 143 (the operator 143 on the right in the embodiment) functions as a seat lock unlocking operator for unlocking the seat lock. An operating cable (pipe) not shown has one end connected to each of the operators 142 and 143. An operation on each of the operators 142 and 143 pulls the corresponding operating cable. This allows the lid 134 of the article storage unit 132 or the seat lock to be unlocked via the corresponding one of the operators 142 and 143. More specifically, the operators 142 and 143 and the operating cables constitute a vehicle forward article storage unit unlocking system and a seat unlocking system.

In addition, in FIG. 5, a meter visor 137 extends upwardly toward the rear from the upper portion cover 52.

Figure 6:
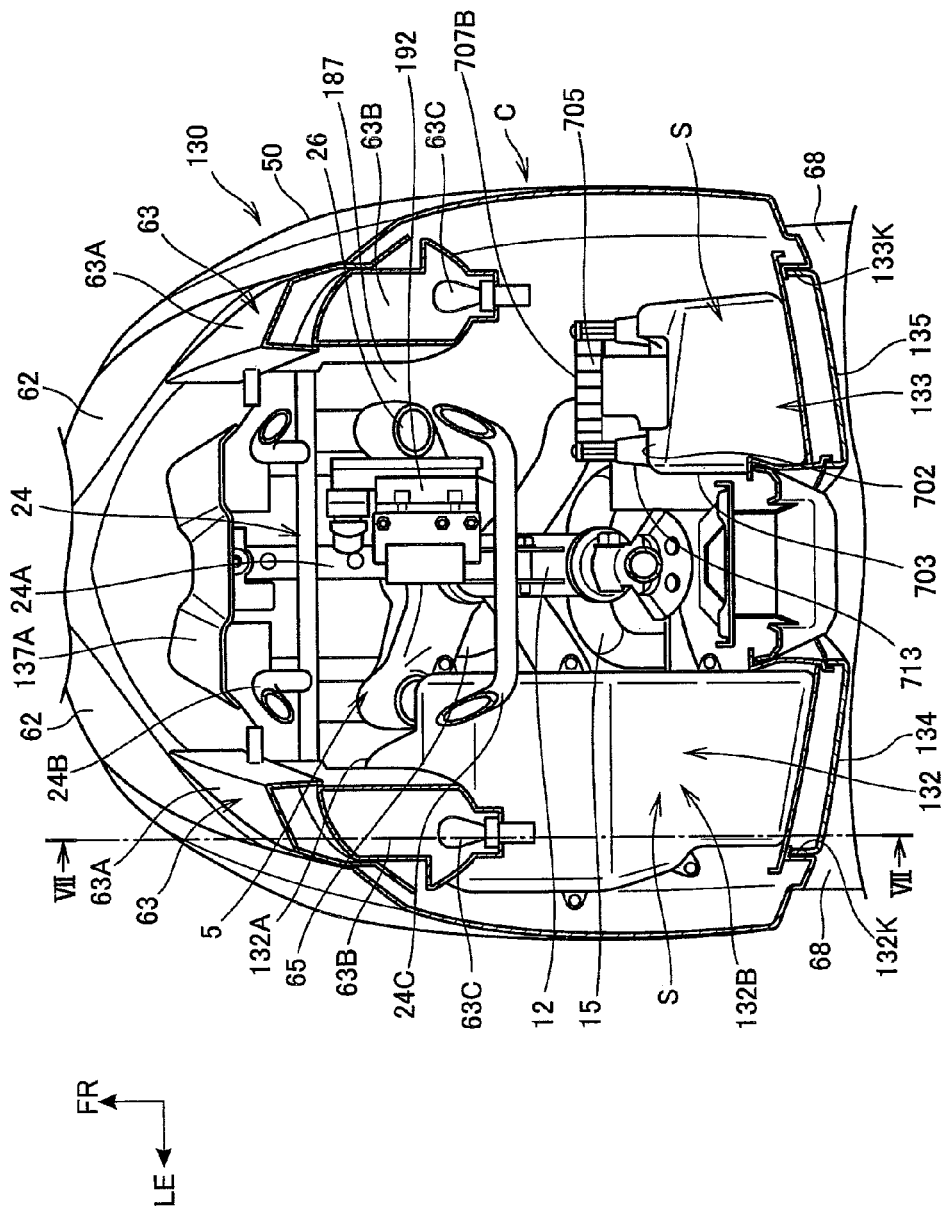
FIG. 6 is a cross-sectional view taken along line VI-VI of FIG. 5.
Figure 7:
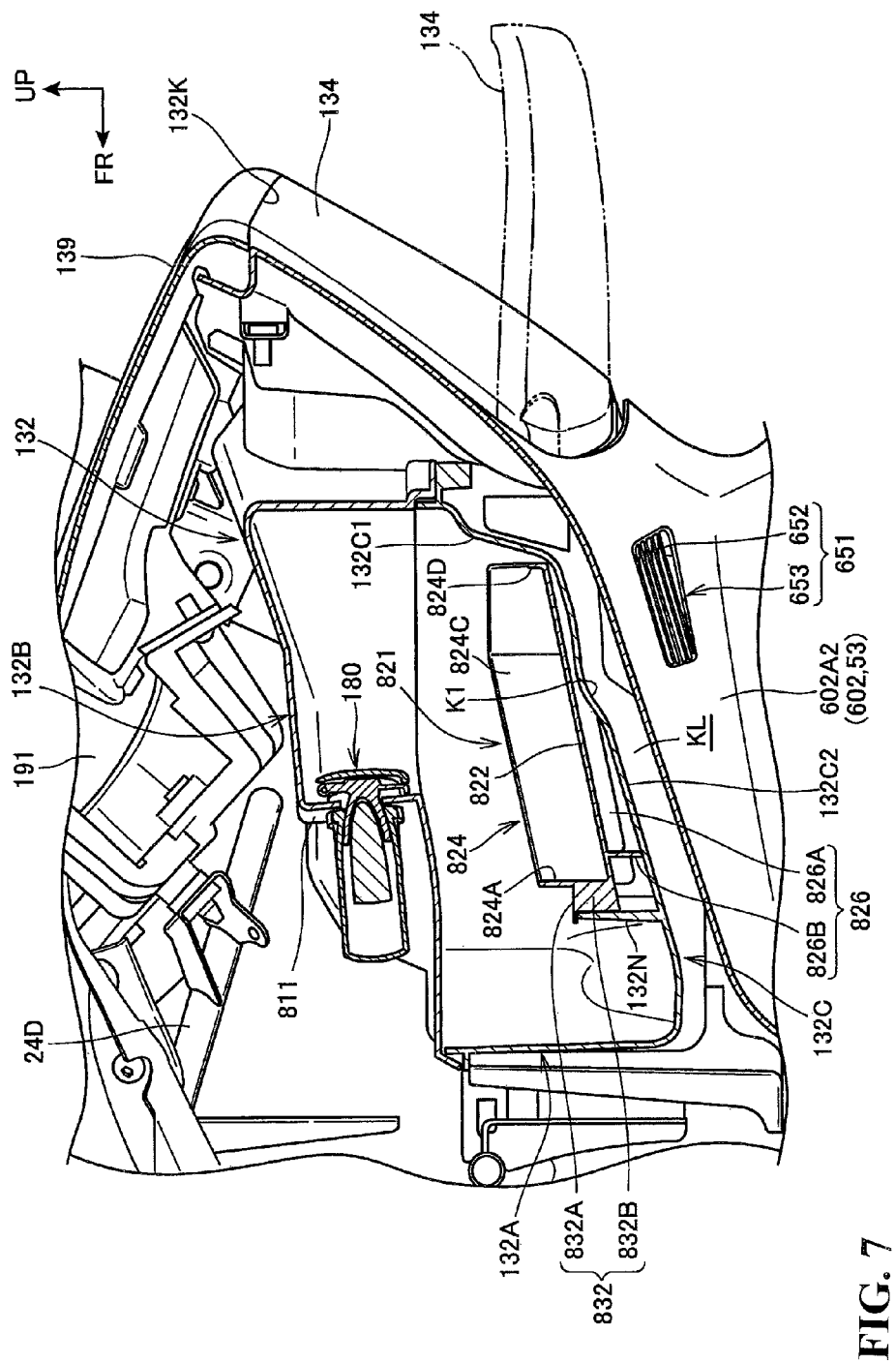
FIG. 7 is a cross-sectional view taken along line VII-VII of FIG. 6.

FIG. 6 is a cross-sectional view taken along line VI-VI of FIG. 5. FIG. 7 is a cross-sectional view taken along line VII-VII of FIG. 6.

As shown in FIG. 6, the basket-shaped front portion frame 24 fixed to the front surface of the head pipe 12 is disposed inside the front portion cover 130. The front portion frame 24 includes a single lower frame 24A, a front side frame-shaped frame 24B, a rear side frame-shaped frame 24C, and an upper frame 24D (FIG. 7). The lower frame 24A is disposed at the vehicle width center (corresponding to a lateral center) and extends forwardly. The front side frame-shaped frame 24B is connected to a front portion of the lower frame 24A and extends vertically. The rear side frame-shaped frame 24C is connected to a rear portion of the lower frame 24A and extends vertically. The upper frame 24D longitudinally connects an upper portion of the front side frame-shaped frame 24B and an upper portion of the rear side frame-shaped frame 24C.

The headlight 62 (FIG. 6) is fixed to a front side of the front side frame-shaped frame 24B and is disposed at a front end of the front cover 50. The direction indicators 63, 63 each include an indicator lens 63A that exposes outwardly and a bulb housing portion 63B disposed inside the front portion cover 130. A light emitting bulb 63C is disposed at a rear end of the bulb housing portion 63B. Bulb housing portions 63B are disposed on both lateral sides of the front portion frame 24 at rearward positions upward of the headlight 62.

A meter unit 191 (FIG. 7) that displays, for example, a vehicle speed is mounted on the upper frame 24D. The meter unit 191 is visible from the rider RD through an opening not shown in the upper portion cover 52.

An ABS modulator (ABS unit) 192 (FIG. 6) that controls lockup of a vehicle brake system (not shown) is disposed at the lower frame 24A on the side of the right bulb housing portion 63B relative to the center in the vehicle width direction. The ABS modulator 192 controls hydraulic pressure of the brake system for the front wheel 2 and the rear wheel 3, thereby controlling the lockup of the brake system. The ABS modulator 192 is shaped into a box in which a plurality of control valves and other parts are housed.

As shown in FIG. 6, the right article storage unit 133 is substantially a box-shaped rectangular parallelepiped bulging forwardly at a position upward of the upper portion inner cover 53 (FIG. 1). The right article storage unit 133 is shaped into a compact storage box having a shallow depth (small longitudinal length), disposed rearwardly relative to the front portion frame 24 at a position on the right side of the head pipe 12. This results in a space being available at a position forward of an inner wall 702 of the right article storage unit 133. The empty space is efficiently utilized by mounting a box-shaped anti-theft device 705 on the inner wall 702.

More specifically, the article storage unit 133 is shaped to have a longitudinal length extending along the vehicle longitudinal direction (a shortest longitudinal length) shorter than its height. Opening the lid 135 provides a simple full view of the inside. Though too tight to store therein a relatively large-sized article such as rain gear in some cases, the article storage unit 133 offers an easy place to store and take out small articles such as tickets and coins.

As shown in FIGS. 6 and 7, the left article storage unit 132 is substantially a box-shaped rectangular parallelepiped bulging forwardly at a position upward of the upper portion inner cover 53 (FIG. 1). The left article storage unit 132 is shaped into a storage box longitudinally longer than the right article storage unit 133, extending up to a space downwardly of the left direction indicator 63. The left article storage unit 132 will be described in detail later.

A leg shield structure of the motorcycle 1 will be described below.

As shown in FIG. 5, the upper portion inner cover 53 and the lower portion inner covers 54, 54 bulge outwardly in the vehicle width direction relative to the seat 10 at a position forward of the rider RD (FIG. 1) and the bulged portions join vertically with no gap interposed to thereby extend vertically, thus forming the leg shield 601 that covers the space forward of the legs of the rider RD.

More specifically, the upper portion inner cover 53 constitutes left and right upper portion leg shields 602, 602 that cover a space forward of knees of the rider RD and parts therearound, and the lower portion inner covers 54, 54 constitute lower portion leg shields 603, 603 that cover a space forward of toes of the rider RD and parts therearound. The upper portion leg shields 602, 602 and the lower portion leg shields 603, 603 thus form the large-sized leg shield 601 covering a vertically extending space forward of the legs and feet of the occupant.

As shown in FIG. 5, the motorcycle 1 has a pair of left and right air exhaust ports 641, 641 formed at left and right side end portions, respectively, of the leg shield 601. The air exhaust ports 641, 641 allow an air flow from the vehicle body forward direction (that corresponds to an air flow entering the front portion cover 130 through the open section 187) to flow through rearwardly. Further, the motorcycle 1 has a pair of left and right air exhaust ports 651, 651 formed at the lateral center of the leg shield 601. The air exhaust ports 651, 651 allow the air flow from the vehicle body forward direction to flow through rearwardly. The air exhaust ports 641, 641 are also symmetrically shaped and the air exhaust ports 651, 651 are symmetrically shaped.

The left and right air exhaust ports 641, 641, formed at the left and right side end portions of the leg shield 601, for allowing the air flow from the vehicle body forward direction to flow through rearwardly supply the air flow from the vehicle body forward direction to left and right sides of the rider RD, thereby preventing the air flowing through the left and right sides of the motorcycle 1 from being dragged inwardly in the vehicle width direction (toward the side of the rider RD). A vacuum can thus be prevented from being created in the space for the rider RD.

In addition, the air exhaust ports 651, 651 formed at the lateral center of the leg shield 601 supply the air flow from the vehicle body forward direction to the lateral center of the leg shield 601. A vacuum can thereby be further prevented from being created in such a portion.

Figure 8:
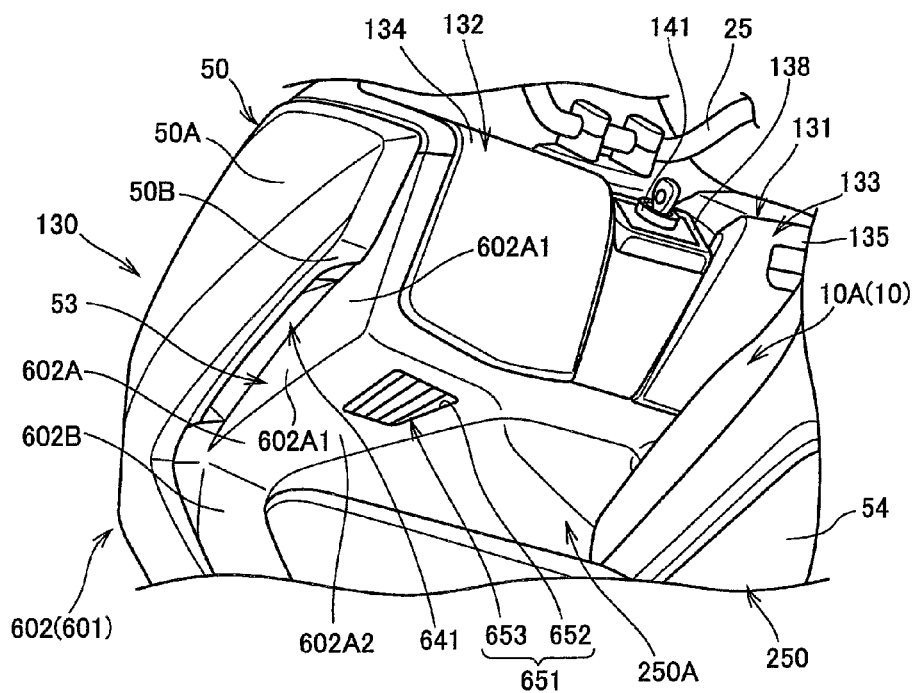
FIG. 8 is a perspective view showing an upper portion leg shield and parts therearound.

FIG. 8 is a perspective view showing the upper portion leg shields 602, 602 and parts therearound viewed from an obliquely downward direction.

As shown in FIG. 8, the upper portion leg shield 602 is formed into a V-shaped cover expanding vertically toward the rear in a side view. More specifically, the upper portion leg shield 602 includes an upper side portion 602A extending upwardly toward the rear and a lower side portion 602B extending downwardly from a front end of the upper side portion 602A toward the rear, the upper side portion 602A being integrated with the lower side portion 602B. The upper side portion 602A includes a side covering portion 602A1 and a bottom covering portion 602A2, the side covering portion 602A1 being integrated with the bottom covering portion 602A2. The side covering portion 602A1 extends longitudinally so as to cover the front portion storage box 131 disposed at the vehicle body front portion from the outside in the vehicle width direction. The bottom covering portion 602A2 extends longitudinally so as to cover the front portion storage box 131 from below. Thus, the upper side portion 602A is formed into a cover that covers the side and the bottom of the front portion storage box 131.

The air exhaust ports 641, 641 described above are formed at upper edges of the upper side portions 602A, 602A. The air exhaust ports 641, 641 each integrally include a vertically long frame body 642, a single vertical fin 643 extending vertically in the frame body 642, and a plurality of horizontal fins 644 extending laterally in the frame body 642. The air exhaust ports 651, 651 described above are each formed in the bottom covering portion 602A2 of the upper portion leg shield 602. The air exhaust ports 651, 651 each integrally include a horizontally long frame body 652 and a plurality of vertical fins 653, each of the vertical fins 653 extending longitudinally in the frame body 652 and being spaced apart from each other.

As shown in FIG. 8, the left and right air exhaust ports 641, 641 are covered in left and right wall portions 50A, 50A of the front cover 50 from the outside in the vehicle width direction. This allows the air exhaust ports 641, 641 to have an appearance buried in the front cover 50. In addition, the air exhaust ports 651, 651 are formed into openings that open in the vehicle vertical direction. This configuration allows the air flow from the vehicle body forward direction not to flow directly through the air exhaust ports 651, 651, but to change its direction downwardly so as to be discharged through the air exhaust ports 651, 651. As a result, while the air flow can be easily discharged through the air exhaust ports 651, 651, dust, rainwater, and other foreign matter entering with the air can be made hard to pass through the air exhaust ports 651, 651.

Figure 9:
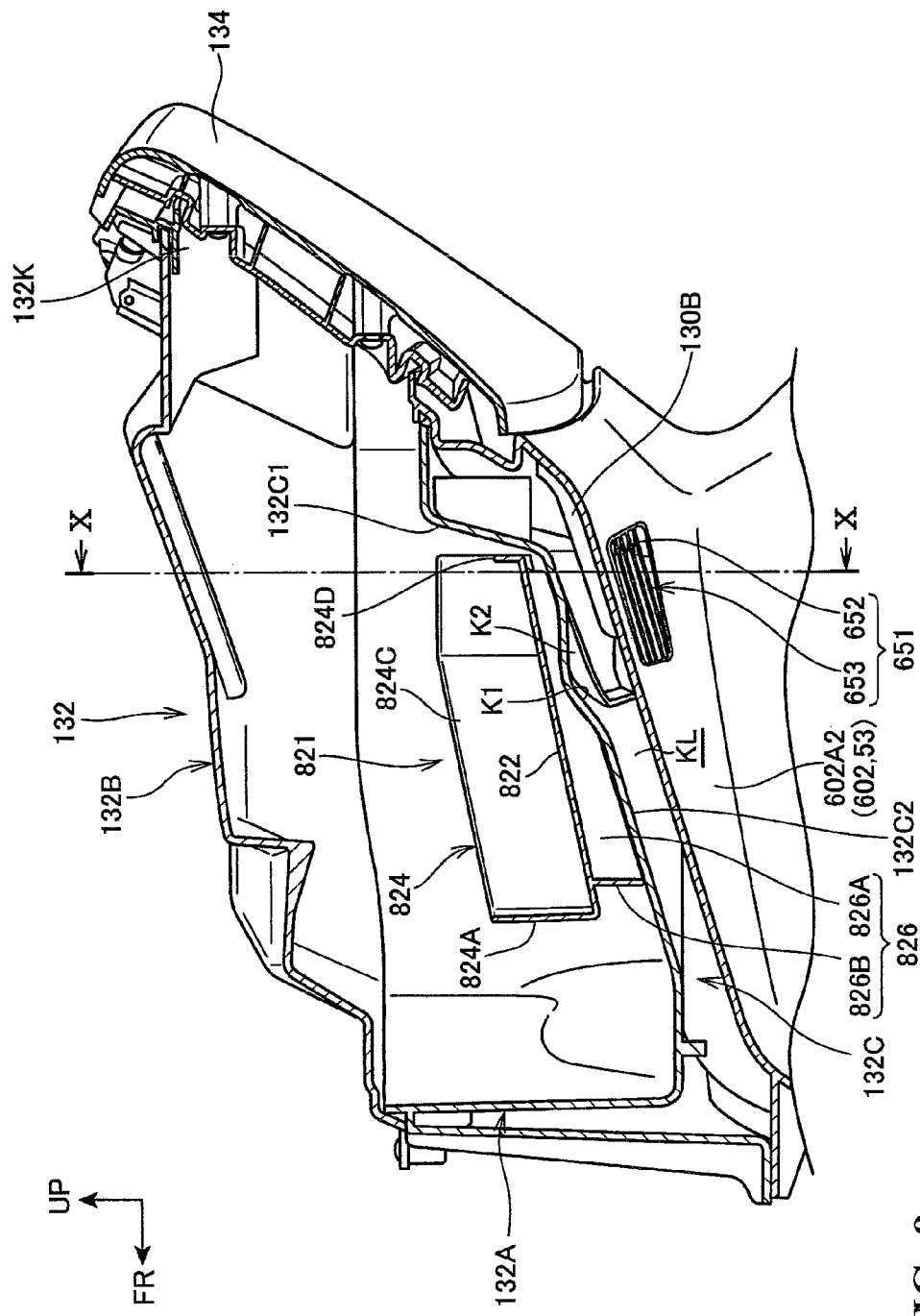
FIG. 9 is a side cross-sectional view of a left article storage unit cut at a substantially center thereof.
Figure 10:
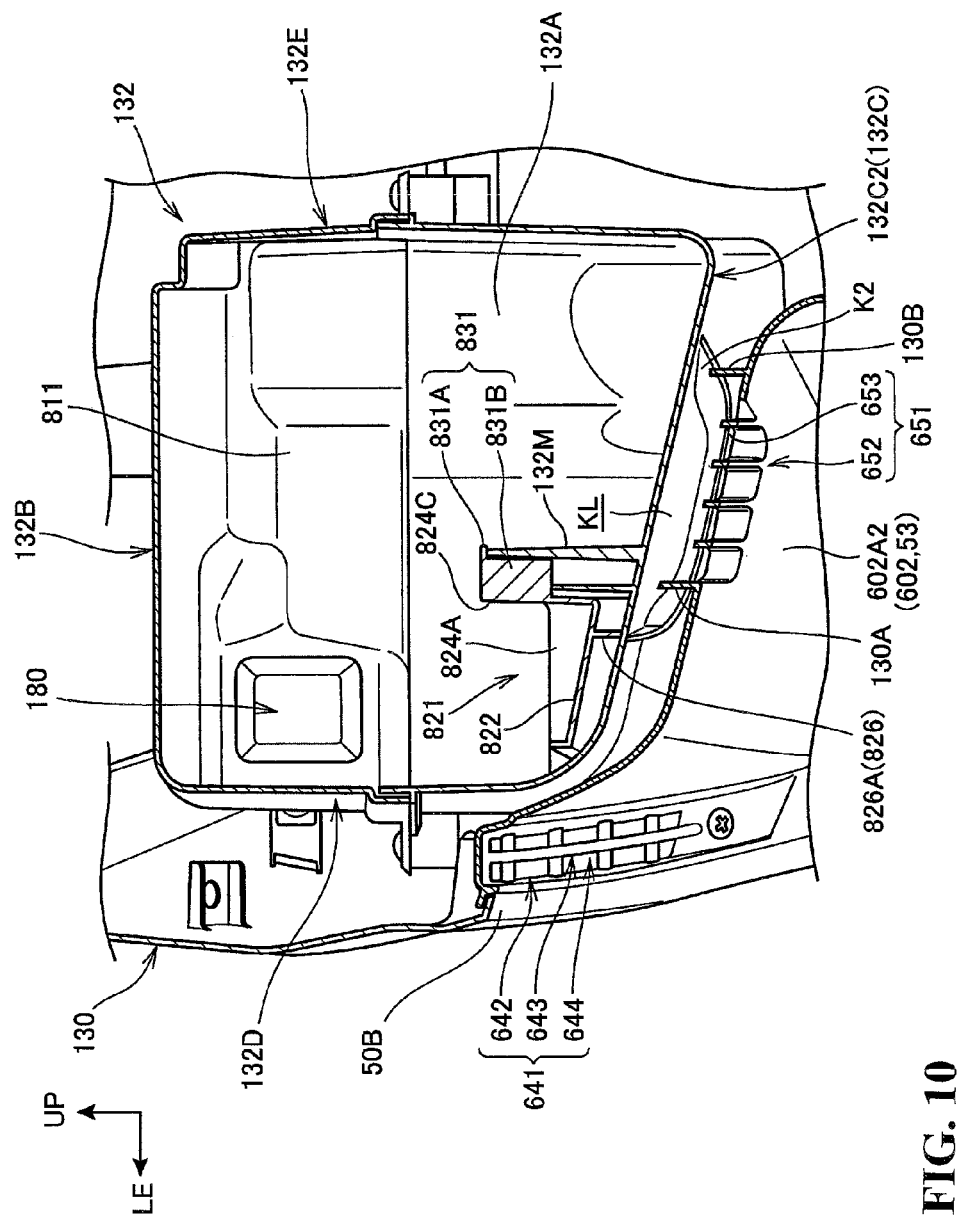
FIG. 10 is a cross-sectional view taken along line X-X of FIG. 9.

FIG. 9 is a side cross-sectional view of the left article storage unit 132 cut at a substantially center thereof. FIG. 10 is a cross-sectional view taken along line X-X of FIG. 9.

Figure 11:
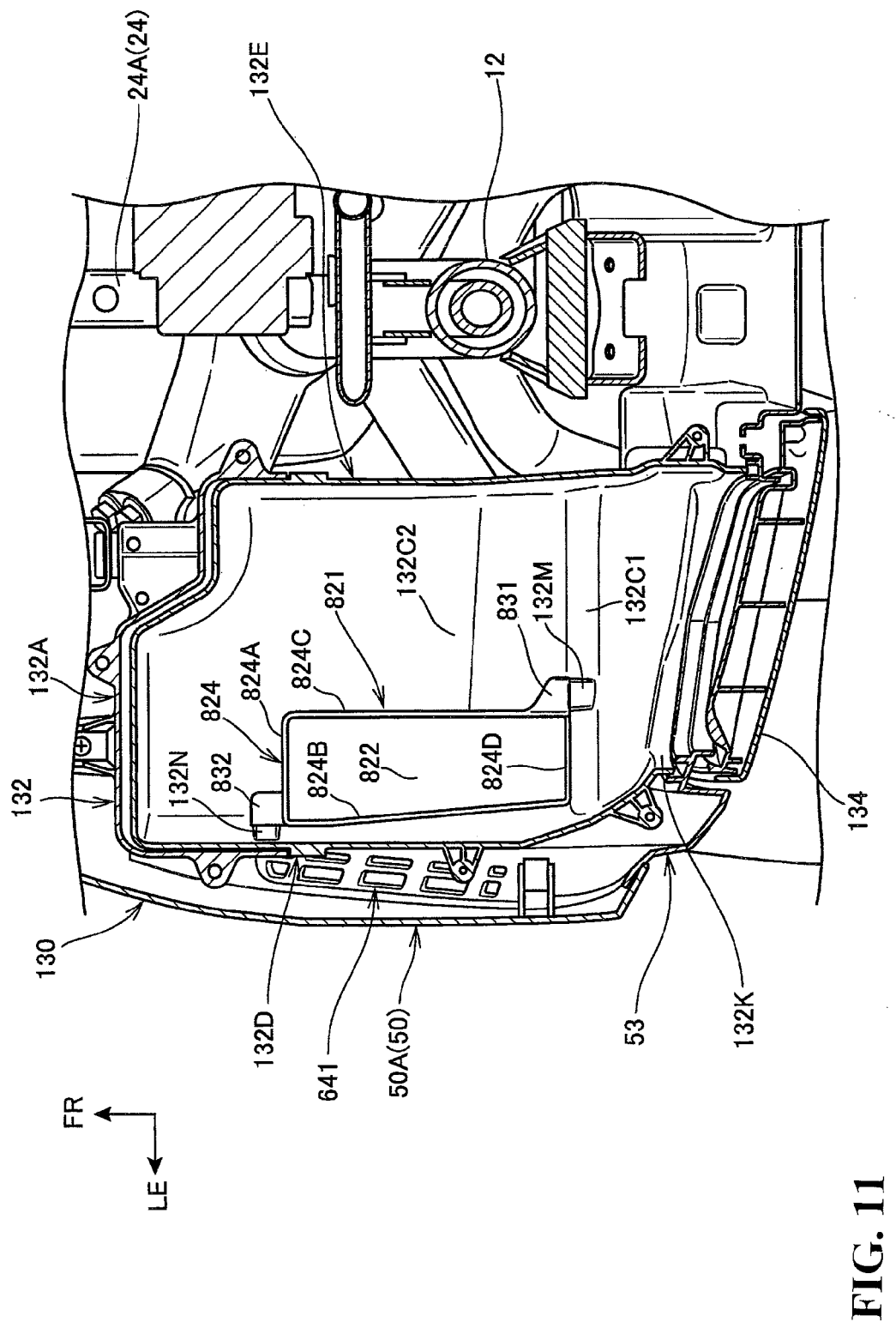
FIG. 11 is an illustration showing a tray and parts therearound viewed from above.

As shown in FIGS. 7, 9, and 10, the left article storage unit 132 includes an inner wall 132A (also called a front wall), a ceiling wall 132B, a bottom wall 132C that faces the ceiling wall 132B, and left and right side walls 132D and 132E (FIG. 11). The left article storage unit 132 has an upper and lower split structure.

The ceiling wall 132B includes a vertical wall 811 (FIGS. 7 and 10) that constitutes a shouldered portion forming a step down in midway toward the front. The vertical wall 811 includes a power supply port 180 connected to a vehicle battery (not shown).

The power supply port 180 is mounted on the outward side in the vehicle width direction and disposed to be oriented toward the opening 132K. Being mounted at the shouldered portion (vertical wall 811) formed in the ceiling wall 132B, as shown in FIG. 7, the longitudinally long, cylindrical power supply port 180 can be compactly disposed without projecting forwardly from the article storage unit 132. Additionally, this arrangement disposes the power supply port 180 closer to the opening 132K (that corresponds to an access port of stored articles), facilitating access to the power supply port 180 from the side of the rider RD.

As shown in FIGS. 7 and 9, the bottom wall 132C of the left article storage unit 132 includes a vertical wall 132C1 that extends downwardly from a position near the opening 132K and an inclined bottom wall 132C2 that extends from a lower end of the vertical wall 132C1 downwardly toward the front.

The vertical wall 132C1 is disposed near the opening 132K and can restrict movement of an article stored between the vertical wall 132C1 and the inner wall 132A toward the opening 132K during, for example, acceleration of the motorcycle 1. The vertical wall 132C1 functions also as a wall standing upright in the rear of the left article storage unit 132, specifically, a rear wall.

The inclined bottom wall 132C2 is formed into a plate shape extending along and in parallel with the bottom covering portion 602A2 of the upper portion leg shield 602 at a position downward of the opening 132K. The inclined bottom wall 132C2 is inclined downwardly toward the front in a side view and inclined downwardly toward the center in the vehicle width direction in a vehicle body rear elevational view (see FIG. 10). This allows the inclined bottom wall 132C2 to be disposed close to the bottom covering portion 602A2, efficiently allotting a storage space for the article storage unit 132.

More specifically, a relatively narrow clearance KL for letting the air flow to the air exhaust port 651 is formed between the inclined bottom wall 132C2 and the bottom covering portion 602A2. In addition, the inclined bottom wall 132C2 has a lower surface that includes, as shown in FIGS. 7 and 9, a recessed portion K1 that is recessed upwardly at a position near a front of the air exhaust port 651. Further, as shown in FIG. 10, a rib wall K2 that extends downwardly so as to surround the left and right sides and the front of the air exhaust port 651 is integrally formed with the lower surface of the inclined bottom wall 132C2.

The rib wall K2 is a U shape opening rearwardly in a vehicle body bottom view. The rib wall K2 is formed into a rib extending so as to surround the front edge and the left and right edges of the left air exhaust port 651. The rib wall K2 thus makes the clearance KL a bent path that is bent vertically both in the vehicle body longitudinal direction and the vehicle body lateral direction, thereby forming an air flow labyrinth path. The rib wall K2 can also enhance strength of the bottom wall 132C of the article storage unit 132.

In addition, the recessed portion K1 of the inclined bottom wall 132C2 also forms a labyrinth path that vertically bends the air flow and facilitates guiding of the air flow toward the left air exhaust port 651. These arrangements can make dust, rainwater, and other foreign matter entering with the air hard to pass through and reduce a flow rate of the air flow to thereby send an adequate amount of air to the side of the rider RD.

Further, a pair of left and right vertical ribs 130A and 130B that extend longitudinally and rise upwardly at the left and right of the air exhaust port 651 is integrally formed with the bottom covering portion 602A2 of the upper portion leg shield 602. The left and right vertical ribs 130A and 130B thus function as guides for outside dust, rainwater, or foreign matter, should it flow into the clearance KL, to be discharged out of the front portion cover 130 along the inclined surface of the front portion cover 130, while avoiding inflow into the air exhaust port 651. The dust, rainwater, and other foreign matter can also be prevented from entering through the air exhaust port 651 into the inside of the front portion cover 130. In addition, the vertical ribs 130A and 130B can enhance cover stiffness around the air exhaust port 651.

As shown in FIG. 9, in the present configuration, the left article storage unit 132 has a tray 821 disposed thereinside. The tray 821 is removably disposed at a position closer to the side of the lid 134 than the inner wall 132A of the article storage unit 132.

Figure 12:
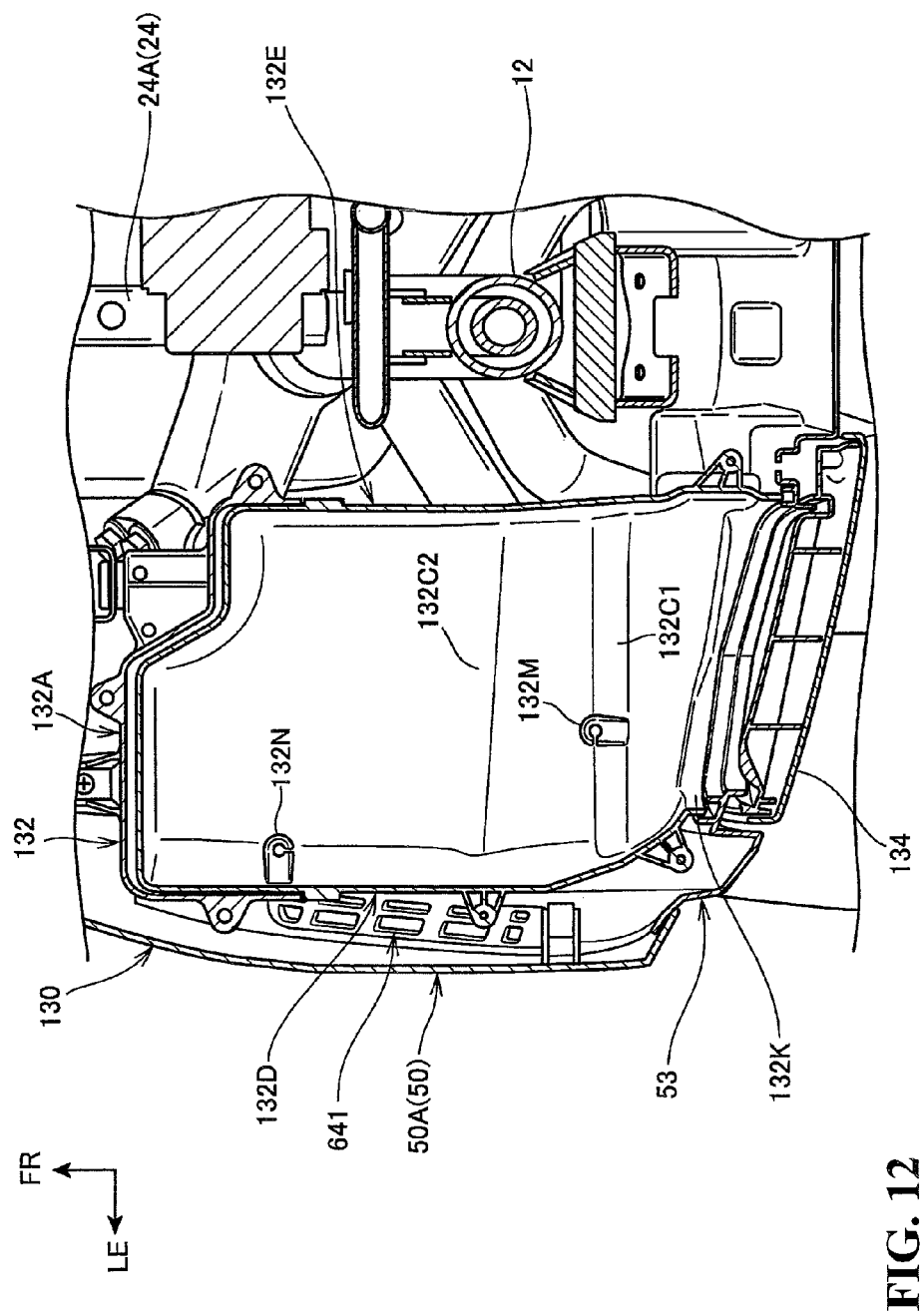
FIG. 12 is an illustration of what is shown in FIG. 11 from which the tray is removed.

FIG. 11 is an illustration showing the tray 821 and parts therearound viewed from above. FIG. 12 is an illustration of what is shown in FIG. 11 from which the tray 821 is removed.

Figure 13:
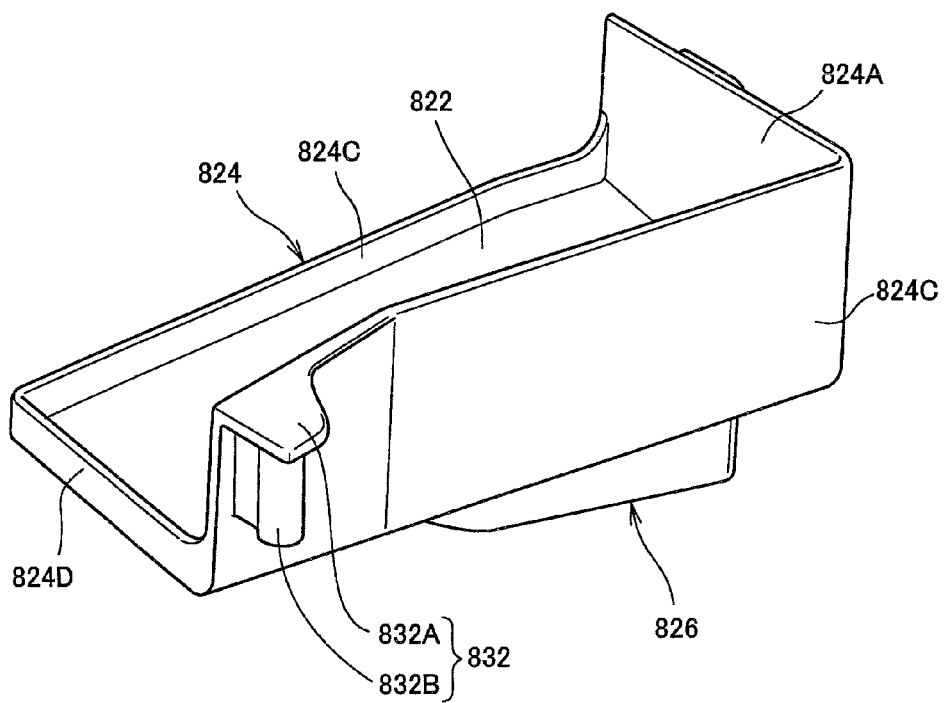
FIG. 13 is a perspective view showing the tray.

FIG. 13 is a perspective view showing the tray 821. FIG. 14(A) is a left side elevational view showing the tray 821, FIG. 14(B) is a top view showing the tray 821, FIG. 14(C) is a bottom view showing the tray 821, and FIG. 14(D) is an illustration showing the tray 821 viewed from the rear (the side of the rider RD).

As shown in FIGS. 9 to 12, the tray 821 is removably disposed at a position spaced away toward the rear from the inner wall 132A of the left article storage unit 132 and on the outer side in the vehicle width direction. The tray 821 integrally includes a bottom wall (hereinafter referred to as a tray bottom wall) 822, a riser wall 824, and a base portion 826. The tray bottom wall 822 is a substantially rectangular flat plate on which an article is placed. The riser wall 824 rises up from all peripheral edges of the tray bottom wall 822. The base portion 826 extends downwardly of the tray bottom wall 822 to be placed on the bottom wall 132C of the article storage unit 132.

As shown in FIGS. 11 and 14(A) to 14(D), the riser wall 824 includes a riser wall 824A standing upwardly from the front edge of the tray bottom wall 822 (hereinafter referred to as a front side riser wall); riser walls 824B and 824C standing upwardly from the left and right side edges, respectively, of the tray bottom wall 822 (hereinafter referred to as a left side riser wall 824B and a right side riser wall 824C); and a riser wall 824D standing upwardly from the rear edge of the tray bottom wall 822 (hereinafter referred to as a rear side riser wall). The adjacent riser walls are connected to each other and the riser wall 824 can prevent the article from falling off from the tray 821.

Of these four riser walls 824A to 824D, the left side riser wall 824B and the rear side riser wall 824D close to the inner walls of the article storage unit 132 (the left side wall 132D and the vertical wall 132C1) are formed into a wall with a height so low as to be able to prevent a small article from falling off, and the front side riser wall 824A and the right side riser wall 824C standing at positions away from the inner walls of the article storage unit 132 are formed into a wall with a height that can prevent a relatively large article from falling off.

Keeping the walls adjacent to the inner walls of the article storage unit 132 (the left side riser wall 824B and the rear side riser wall 824D) relatively low in height as described above allows the storage volume of the tray 821 to be expanded to the inner walls of the article storage unit 132 and, at the same time, allows the inner walls of the article storage unit 132 to prevent the article in the tray 821 from moving therebeyond. Meanwhile, the walls standing at positions away from the inner walls of the article storage unit 132 (the front side riser wall 824A and the right side riser wall 824C) are formed into high walls, which can prevent the article inside the tray 821 from moving outside the tray 821. In addition, these high walls (the front side riser wall 824A and the right side riser wall 824C) may even be used to conveniently partition the space in the article storage unit 132 longitudinally and laterally.

The tray 821 may, for example, be used as a space for storing compact electronic devices, such as a cellular phone and a personal digital assistant (PDA) carried by the rider RD.

Further, the space outside the tray 821 laterally partitioned by the right side riser wall 824C of the tray 821 may be used as a space for storing a relatively long article, such as rain gear. These arrangements can avoid a situation in which it is difficult to reach a compact electronic device stored in an inner part of the longitudinally long article storage unit 132, while a longitudinally long article may be stored in the article storage unit 132. Furthermore, as shown in FIG. 10, the power supply port 180 is exposed above the tray 821. This facilitates sourcing of operating power or charging power for the compact electronic device from the power supply port 180.

It is noted that, in addition to the compact electronic device, any arbitrary article may be stored in the tray 821 as appropriate. Nonetheless, the tray 821 offers good ease of removal and is particularly suitable for storage of compact articles that are to be stored and removed frequently.

In addition, the space forward of the tray 821 partitioned by the front side riser wall 824A of the tray 821 is suitable for storing compact articles that are less frequently used (e.g., a waste cloth and an emergency tool). This innermost space can also be used and the entire space available in the longitudinally long article storage unit 132 can be efficiently used.

In addition, to store an even larger article in the article storage unit 132, the tray 821 may be removed. The removal of the tray 821 from the article storage unit 132 provides a storage space offering a high degree of freedom.

The tray bottom wall 822 and the base portion 826 will be described below.

The tray bottom wall 822 is shaped to be inclined along the bottom wall 132C (inclined bottom wall 132C2) of the article storage unit 132. More specifically, the tray bottom wall 822 is formed to be inclined downwardly toward the front in a vehicle side view (see FIG. 9) and inclined downwardly toward the center in the vehicle width direction in a vehicle width direction cross-sectional view (see FIG. 10). This allows the tray bottom wall 822 to be disposed close to the bottom wall 132C of the article storage unit 132 to thereby acquire a wider space on the tray 821. The arrangement also allows the article stored in the tray 821 (e.g., a compact electronic device) to be positioned substantially at a position closer to the front side of the tray 821 and toward the vehicle width center.

The stored article can thus be disposed closer to the side of the rider RD, enhancing convenience, such as ease of removal. Another effect that can be achieved is that, compared with an arrangement in which the tray bottom wall 822 is shaped to be horizontally flat, the stored article is less affected by longitudinal and lateral movements of the motorcycle 1.

The base portion 826 of the tray 821 is formed into a vertical rib substantially having an L shape in a bottom view. The base portion 826 of the tray 821 extends along the bottom wall 132C (inclined bottom wall 132C2) of the article storage unit 132 so as to floatingly support the tray bottom wall 822. The floating support raises the level of the stored article in the tray 821, so that the rider RD can more easily view the stored article when the opening 132K is open even with a structure in which the inclined bottom wall 132C2 is formed downwardly of the opening 132K. This enhances ease of storage and removal.

The base portion 826, when installed in the vehicle body, includes a first base portion 826A that extends linearly in the longitudinal direction and a second base portion 826B that extends from a front end of the first base portion 826A linearly in an orthogonal direction (that corresponds to the vehicle width direction). As shown in FIG. 10, the first base portion 826A extends longitudinally at a position closer to the center in the vehicle width direction with respect to the tray 821. The first base portion 826A can thus support appropriately a load of the stored article disposed closer to the vehicle width center on the tray 821. In addition, the second base portion 826B extends laterally across the tray 821, so that lateral play in the tray 821 can be efficiently contained. The first base portion 826A and the second base portion 826B can further achieve an improved stiffness of the tray 821.

As described earlier, the bottom wall 132C of the article storage unit 132 on which the tray 821 is mounted is not a simple flat surface, but a complicated curved surface that bulges upwardly so as to form the recessed portion K1 that is recessed upwardly at a position near the front of the air exhaust port 651.

The first base portion 826A of the base portion 826 is formed, as shown in FIG. 9, into a shape that follows the shape of the bottom wall 132C of the article storage unit 132. The first base portion 826A is thus disposed such that it straddles longitudinally across the recessed portion K1 that is recessed upwardly at the position near the front of the air exhaust port 651 to thereby be brought into abutment with the inclined bottom wall 132C2 of the article storage unit 132. This results in the tray 821 being in abutment with the complicated surface shape, thus allowing the tray 821 to be positioned easily and achieving reduction in size of the tray 821.

Moreover, the complicated surface shape allows the capacity of the article storage unit 132 to be enlarged as much as possible, while considering structures of parts around the article storage unit 132 (such as parts layout), thus improving convenience. In addition, the tray 821 has a flat upper surface, which allows a small article having a flat surface, such as a compact electronic device, to be easily stored.

A locking structure of the tray 821 will be described below.

The tray 821 has a pair of locking portions 831 and 832 (FIGS. 14(A) to 14(D)) that are engaged with locked portions 132M and 132N (FIG. 12), respectively, formed previously on the article storage unit 132, so that the tray 821 can be fixed in the article storage unit 132. As shown in FIGS. 14(A) to 14(D), the pair of locking portions 831 and 832 are integrally formed at a rearmost end portion of the right side riser wall 824C and an end portion on the outer side in the vehicle width direction of the front side riser wall 824A, respectively, the end portion being the remotest from the rearmost end portion. The locking portions 831 and 832 are formed to include projections 831B and 832B, respectively, that protrude downwardly from proximal end portions 831A and 832A, respectively, disposed at upper ends.

Figure 15:
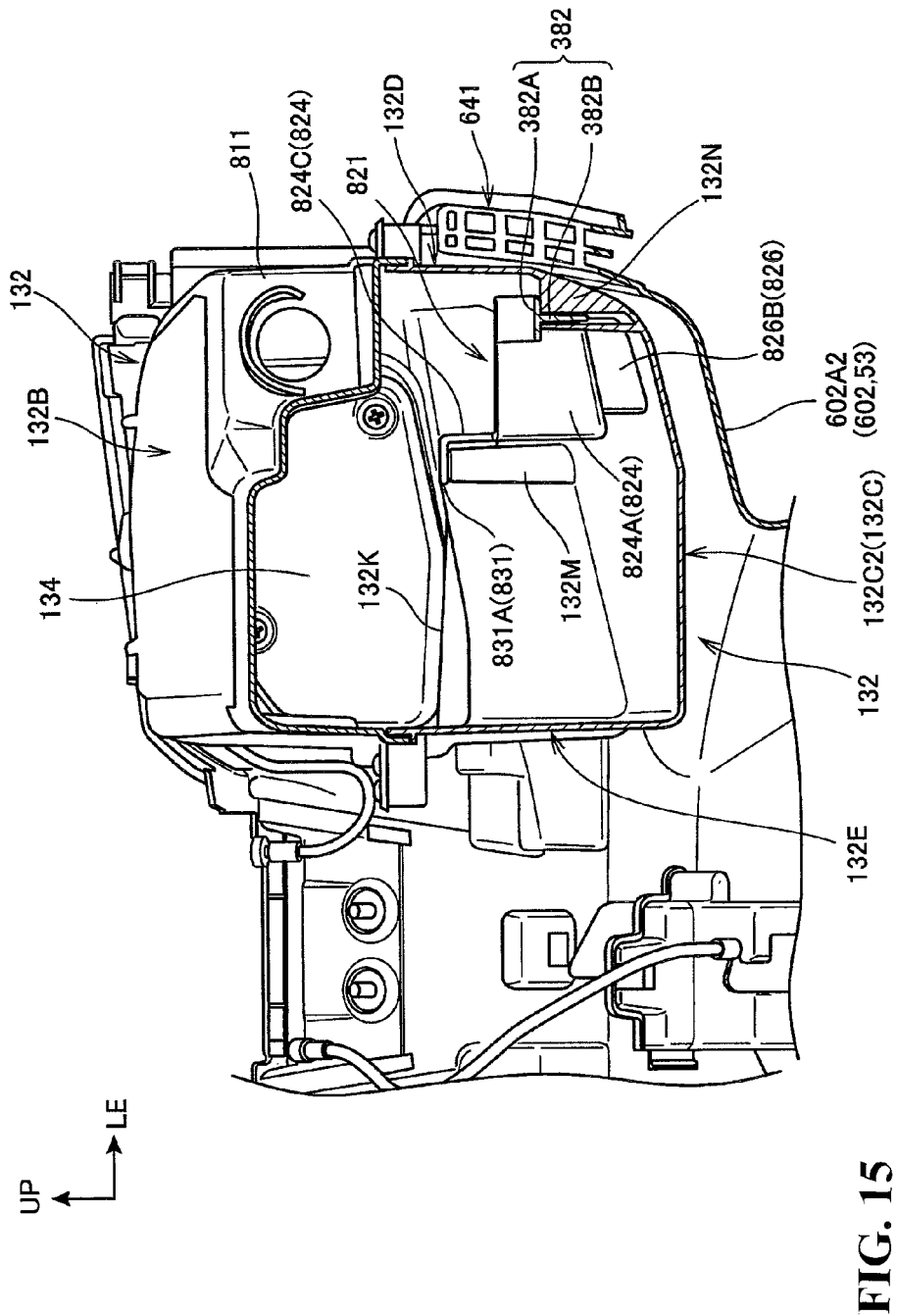
FIG. 15 is an illustration showing a pair of locked portions viewed from a vehicle body front side.

FIG. 15 is an illustration showing the pair of locked portions 132M and 132N viewed from the vehicle body front side.

As shown in FIGS. 15 and 12, the locked portions 132M and 132N are formed into U-shaped fit portions that have clearances into or from which the projections 831B and 832B of the pair of locking portions 831 and 832 can advance from above or retract, respectively, and in rear of which the projections 831B and 832B engage. The tray 821 can thus be locked to fix to the article storage unit 132 by inserting the pair of locking portions 831 and 832 of the tray 821 into the locked portions 132M and 132N, respectively, disposed on the article storage unit 132 from above.

The above-described mounting step requires no fastening members, so that no tools or the like are required for removal or reinstallation of the tray 821, which facilitates removal/reinstallation. Moreover, the pair of locking portions 831 and 832 is formed to be spaced apart from each other in the longitudinal and lateral directions (FIGS. 14(A) and 14(C)), and in the vertical direction, as well, as shown in FIGS. 14(D) and 15. This achieves another effect of the tray 821 being difficult to come off position even with a longitudinal, lateral, or vertical force acting thereon as a result of, for example, vehicle body vibrations.

In addition, referring to FIG. 12, the pair of locked portions 132M and 132N is disposed adjacent to the left side wall 132D that is the wall on the outer side in the vehicle width direction of the article storage unit 132 and the vertical wall 132C1 near the opening 132K, the vertical wall 132C1 constituting the bottom wall 132C of the article storage unit 132. Even when the tray 821 is removed therefrom, the pair of locked portions 132M and 132N is not hindrances in the article storage unit 132, so that a large-sized article can be easily stored by taking advantage of the large capacity of the article storage unit 132. In addition, the pair of locked portions 132M and 132N can be reinforced by the wall surfaces of the article storage unit 132, that enables reduction in weight and size of the pair of locked portions 132M and 132N.

As described heretofore, in the present embodiment, the article storage unit 132 is provided so as to include the opening 132K in the rear surface of the front portion cover 130 and at a position facing the occupant and to be longer in the longitudinal length extending in the vehicle longitudinal direction than in height. In addition, the removable tray 821 is disposed at a position closer to the lid 134 than the inner wall 132A of the article storage unit 132, the tray 821 including the riser walls 824 (824A to 824D) along its periphery. Thus, the tray 821 can enhance ease of storage and removal of a small article even in the longitudinally long storage space.

Moreover, when a relatively large article is to be stored, the tray 821 may be removed to allow the large article to be stored. This enhances the ease of storage and removal of various sizes of articles, providing a utility space suitable for the motorcycle 1.

The article storage unit 132 is disposed on the one side in the vehicle width direction of the head pipe 12 that steerably supports the front wheel 2 and the tray 821 is disposed closer to the one side in the vehicle width direction on the bottom wall 132C of the article storage unit 132. When the rider RD faces the stored article through the opening 132K, the rider RD can easily recognize the tray 821 and the article stored in the tray 821, which also enhances ease of storage and removal.

In addition, the inclined bottom wall 132C2 that constitutes the bottom wall 132C of the article storage unit 132 is formed downwardly of the opening 132K. This expands the storage space downwardly, while mounting of the tray 821 raises the level of the storage position, achieving better visibility and ease of storage and removal of a small article. The article stored in the tray 821 can also be taken out by removing the tray 821.

The tray 821 is disposed adjacent to the left side wall 132D on the outer side in the vehicle width direction and to the inner wall 132A of the article storage unit 132. In addition, the left side riser wall 824B adjacent to the left side wall 132D is formed to be lower in height than the riser walls not adjacent thereto (the front side riser wall 824A and the right side riser wall 824C). The storage space of the tray 821 can thus be partitioned using the article storage unit 132 thereby to increase the storage capacity of the tray 821 and to facilitate loading and unloading of articles.

In addition, the rear side riser wall 824D of the tray 821 is formed to be lower in height as with the left side riser wall 824B adjacent to the left side wall 132D. This also increases the storage capacity of the tray 821 and facilitates removal of the stored article.

The article storage unit 132 has the power supply port 180 and the tray 821 is disposed downwardly of the power supply port 180. This allows a compact electronic device requiring external electric power to be placed in the tray 821 and supplied with the electric power. A power wire can be routed without being impeded by other stored articles.

In addition, the tray 821 includes the projections 831B and 832B and the article storage unit 132 includes the U-shaped fit portions (the locked portions 132M and 132N) having clearances into or from which the projections 831B and 832B can advance or retract, respectively, and in rear of which the projections 831B and 832B engage. These arrangements enhance ease of removal of the tray 821.

The tray bottom wall 822 is inclined so as to be lower in level toward the center in the vehicle width direction. The inclined tray bottom wall 822 allows an article to be stored closer to the center in the vehicle width direction in the tray 821, thus enhancing convenience, such as ease of removal of the stored article.

The bottom wall 132C (the inclined bottom wall 132C2) of the article storage unit 132 in which the tray 821 is mounted has the curved surface shape bulging upwardly so as to form the recessed portion K1 that is upwardly recessed. The tray 821 includes the base portion 826 that is brought into abutment with and along the curved surface shape of the bottom wall 132C. Therefore, the capacity of the article storage unit 132 can be enlarged as much as possible and the tray 821 can be positioned easily and compactly, while structures of parts around the article storage unit 132 are taken into consideration.

The embodiment described heretofore merely illustrates one aspect of the present invention and modifications or applications may be made arbitrarily without departing from the scope of the present invention.

For example, the present invention can be applied to, in addition to the motorcycle 1, saddle riding type vehicles including types of vehicles other than the motorcycle. It is to be noted that the saddle riding type vehicle includes common types of vehicles in which a rider straddles the vehicle body to ride, including not only motorcycles (including motorized bicycles) but also three-wheeled vehicles and four-wheeled vehicles classified into all-terrain vehicles (ATVs).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A storage structure of a saddle riding vehicle, the storage structure comprising:
    a front portion cover for covering a front portion of the saddle riding vehicle;
    a storage unit disposed in the front portion cover, the storage unit having an opening formed in a rear surface of the front portion cover at a position facing a rider; and
    a lid for opening and closing the opening;
    wherein the storage unit is formed to be longer in a longitudinal length extending in a vehicle longitudinal direction than in a height; and
    a removable tray is disposed at a position closer to the lid than an inner wall of the storage unit, the tray including riser walls at a peripheral edge portion and a bottom wall inclined so as to be lower in level toward a center in a vehicle width direction.

2. The storage structure of a saddle riding vehicle according to claim 1, wherein the saddle riding vehicle includes:
    a head pipe for steerably journaling a front wheel; and
    a seat disposed at a vehicle width center rearward of the head pipe;
    the storage unit is disposed on one side in a vehicle width direction of the head pipe; and
    the tray is disposed on the one side in the vehicle width direction of a bottom wall of the storage unit.

3. The storage structure of a saddle riding vehicle according to claim 1, wherein that the bottom wall of the storage unit is formed downwardly of the opening.

4. The storage structure of a saddle riding vehicle according to claim 2, wherein that the bottom wall of the storage unit is formed downwardly of the opening.

5. The storage structure of a saddle riding vehicle according to claim 1, wherein the tray is disposed adjacent to a side wall on an outer side in the vehicle width direction of the storage unit and the inner wall of the storage unit; and
    said riser walls including at least a first riser wall and a second riser wall, the first riser wall being adjacent to the side wall is formed to be lower in height relative to the second riser wall not being adjacent to the side wall.

6. The storage structure of a saddle riding vehicle according to claim 2, wherein the tray is disposed adjacent to a side wall on an outer side in the vehicle width direction of the storage unit and the inner wall of the storage unit; and
    said riser walls including at least a first riser wall and a second riser wall, the first riser wall being adjacent to the side wall is formed to be lower in height relative to the second riser wall not being adjacent to the side wall.

7. The storage structure of a saddle riding vehicle according to claim 3, wherein the tray is disposed adjacent to a side wall on an outer side in the vehicle width direction of the storage unit and the inner wall of the storage unit; and
    said riser walls including at least a first riser wall and a second riser wall, the first riser wall being adjacent to the side wall is formed to be lower in height relative to the second riser wall not being adjacent to the side wall.

8. The storage structure of a saddle riding vehicle according to claim 1, wherein the storage unit has a power supply port and the tray is disposed downwardly of the power supply port.

9. The storage structure of a saddle riding vehicle according to claim 2, wherein the storage unit has a power supply port and the tray is disposed downwardly of the power supply port.

10. The storage structure of a saddle riding vehicle according to claim 3, wherein the storage unit has a power supply port and the tray is disposed downwardly of the power supply port.

11. The storage structure of a saddle riding vehicle according to claim 5, wherein the storage unit has a power supply port and the tray is disposed downwardly of the power supply port.

12. The storage structure of a saddle riding vehicle according to claim 1, the storage structure further comprising:
    projections disposed on the tray; and
    U-shaped fit portions disposed on the storage unit, the U-shaped fit portions having clearances into or from which the projections can advance or retract, respectively, and in a rear of which the projections engage.

13. The storage structure of a saddle riding vehicle according to claim 2, the storage structure further comprising:
    projections disposed on the tray; and
    U-shaped fit portions disposed on the storage unit, the U-shaped fit portions having clearances into or from which the projections can advance or retract, respectively, and in a rear of which the projections engage.

14. The storage structure of a saddle riding vehicle according to claim 3, the storage structure further comprising:
    projections disposed on the tray; and
    U-shaped fit portions disposed on the storage unit, the U-shaped fit portions having clearances into or from which the projections can advance or retract, respectively, and in a rear of which the projections engage.

* * * * *